(12) United States Patent
Maheshwari et al.

(10) Patent No.: US 10,098,170 B2
(45) Date of Patent: Oct. 9, 2018

(54) OPPORTUNISTIC WIDE AREA NETWORK AND DEVICE TO DEVICE COEXISTENCE

(71) Applicant: QUALCOMM Incorporated, San Diego, CA (US)

(72) Inventors: Ankit Maheshwari, Hyderabad (IN); Parthasarathy Krishnamoorthy, San Diego, CA (US); Akash Kumar, Hyderabad (IN); Aritra Ukil, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 35 days.

(21) Appl. No.: 15/371,865

(22) Filed: Dec. 7, 2016

(65) Prior Publication Data

US 2018/0160456 A1    Jun. 7, 2018

(51) Int. Cl.
*H04W 76/14*    (2018.01)
*H04W 72/04*    (2009.01)
*H04L 5/14*    (2006.01)
*H04W 76/28*    (2018.01)
*H04W 92/18*    (2009.01)

(52) U.S. Cl.
CPC .............. *H04W 76/14* (2018.02); *H04L 5/14* (2013.01); *H04W 72/0446* (2013.01); *H04W 76/28* (2018.02); *H04W 92/18* (2013.01)

(58) Field of Classification Search
CPC . H04W 76/14; H04W 76/28; H04W 72/0446; H04W 76/023; H04W 76/048; H04L 5/14
See application file for complete search history.

(56) References Cited

U.S. PATENT DOCUMENTS

| 9,510,287 B2 | 11/2016 | Lu et al. |
| 2011/0237231 A1 | 9/2011 | Horneman et al. |
| 2014/0198680 A1* | 7/2014 | Siomina ............ H04L 5/14 370/252 |

(Continued)

FOREIGN PATENT DOCUMENTS

| WO | 2014182019 A1 | 11/2014 |
| WO | 2016108456 A1 | 7/2016 |

OTHER PUBLICATIONS

International Search Report and Written Opinion—PCT/US2017/064679 —ISA/EPO—dated Mar. 8, 2018.

(Continued)

*Primary Examiner* — Duc C Ho
(74) *Attorney, Agent, or Firm* — Patterson & Sheridan, L.L.P.

(57) ABSTRACT

Certain aspects of the present disclosure relate to methods and apparatus for wireless communication, and more specifically to opportunistic wide area network (WAN) and device to device (D2D) coexistence. According to certain aspects of the present disclosure, a method of wireless communications by an apparatus is provided. The method generally includes communicating with a base station using fewer wireless chains than supported by the apparatus, determining at least a first wireless chain of the wireless chains is available for communicating, and communicating, via device-to-device communications, with another apparatus using one of the at least a first wireless chain while communicating with the base station.

26 Claims, 22 Drawing Sheets

(56) References Cited

U.S. PATENT DOCUMENTS

| | | |
|---|---|---|
| 2015/0043446 A1 | 2/2015 | Tsirtsis et al. |
| 2015/0271870 A1 | 9/2015 | Agiwal et al. |
| 2016/0044740 A1 | 2/2016 | Siomina et al. |
| 2016/0205717 A1* | 7/2016 | Kazmi .................. H04W 8/005 |
| | | 455/435.2 |
| 2016/0337894 A1* | 11/2016 | Lim .................. H04W 28/0215 |
| 2017/0041773 A1* | 2/2017 | Fujishiro ............... H04W 76/14 |
| 2017/0104509 A1* | 4/2017 | Khlat .................... H04L 5/1461 |
| 2017/0367059 A1 | 12/2017 | Park et al. |
| 2018/0049268 A1* | 2/2018 | Tenny ................ H04W 76/048 |

OTHER PUBLICATIONS

Samsung: "Discovery Monitoring in RRC Connected State", 3GPP Draft; R2-142200, 3rd Generation Partnership Project (3GPP), Mobile Competence Centre; 650, Route Des Lucioles; F-06921 Sophia-antipolis Cedex; France, vol. RAN WG2, No. Seoul, South Korea; May 19, 2014-May 23, 2014 May 18, 2014 (May 18, 2014), XP050793403, Retrieved from the Internet: URL:http://www.3gpp.org/ftp/Meetings_3GPP_SYNC/RAN2/Docs/ [retrieved on May 18, 2014], 4 pages.

\* cited by examiner

1200

| UPLINK-DOWNLINK CONFIGURATION | DOWNLINK TO UPLINK SWITCH PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 12

OPPORTUNISTIC WIDE AREA NETWORK AND DEVICE TO DEVICE COEXISTENCE

TECHNICAL FIELD

The present disclosure relates generally to wireless communication, and more particularly, to methods and apparatus for opportunistic wide area network (WAN) and device to device (D2D) coexistence, such as LTE Advanced and LTE-D, respectively.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power).

Increasingly, wireless environments have a high density of wireless devices, which presents various opportunities, for example, for vendors of goods and services to reach potential customers. However, the large number of wireless devices and limited coverage areas also creates a challenge to quickly and efficiently discover those most likely to be interested in the particular goods or services offered.

In some cases, wireless devices may be capable of supporting LTE-D, which helps enable always-on discovery of up to thousands of other nearby devices and services associated with those other devices in a private and secure way. LTE-D may be implemented using, at least in part, spectrum that may be used by other wireless networks, such as LTE. This reuse helps allow components, such as a wireless chain, to be shared between, for example, LTE and LTE-D. Currently when wireless devices attempt to communicate with other devices using LTE-D, the wireless device needs to wait for an allocation of a specific time, frequency, and bandwidth in which to perform LTE-D operations. As a result, current wireless devices typically are limited to performing LTE-D operations during idle periods or potentially during connected mode discontinuous reception (CDRX) CDRX periods. This scheduling requirement may be inefficient and the wireless device may not be able to utilize certain opportunities to perform LTE-D operations a result of which scheduling and transmissions may be missed by UEs during CDRX periods.

SUMMARY

Aspects of the present disclosure provide a method for wireless communications. The method generally includes communicating with a base station using fewer wireless chains than supported by the apparatus, determining at least a first wireless chain of the wireless chains is available for communicating, and communicating, via device-to-device communications, with another apparatus using one of the at least a first wireless chain while communicating with the base station.

Aspects also provide various apparatus, systems, computer program products, and processing systems for performing the operations described above.

BRIEF DESCRIPTION OF THE DRAWINGS

FIG. 12 illustrates example TDD uplink and downlink configurations 1200, according to aspects of the present disclosure.

DETAILED DESCRIPTION

Figure 1:
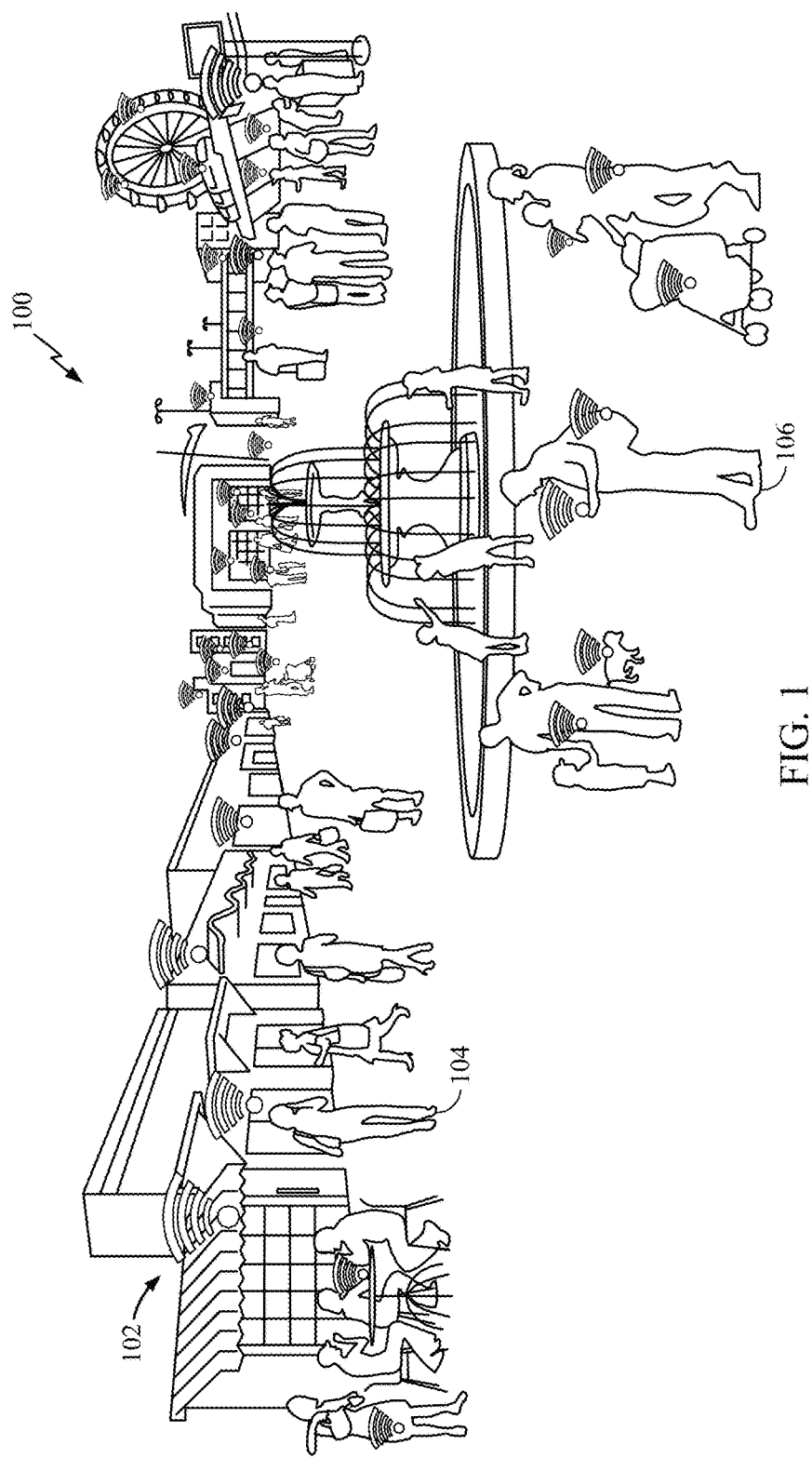
FIGS. 1 and 1A illustrate an example environment in which aspects of the present disclosure may be practiced.

Certain aspects of the present disclosure provide techniques that may be used to enable opportunistic coexistence between network types, (e.g. peer-to-peer, mesh, device to device, WAN type networks). Generally, UEs may be configured to prioritize certain types of wireless network activity, such as LTE or WAN activity, over device to device (D2D) activity and may perform D2D activity during idle or when other WAN activity is not ongoing. However, limiting D2D activity to certain scheduled times may result in missed communications opportunities. For example, certain D2D technologies may support transmission only modes and UEs which support carrier aggregation, but not using all transmit or receive chains at a particular time may be able to perform certain D2D operations, such as transmitting a LTE-D expression, while communicating with another wireless network. As used herein, the term "expression" generally refers to a transmission sent from a device that includes information allowing discovery of that device and/or goods or services provided by that device As will be described herein, relaying of discovery information, in peer-to-peer fashion (or other network arrangement) may effectively extend the wireless coverage area of vendors, for example. This can enable more potential customers to learn of goods and services offered by those vendors. Components of networks can either be static or dynamic for provision of relayed information. This can also enable users to passively receive information to learn about information of interest.

In relaying information, device may perform device discovery. This discovery, along with other D2D operations, may be performed at a lower priority as compared to WAN activity. In some cases, this activity may correspond to idle or CDRX off periods. As such, techniques for performing opportunistic D2D activities in resources not actively used by the WAN during times when a UE is otherwise active may be advantageous.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

An Example Wireless Environment

Aspects of the present disclosure provide device to device (D2D) mechanisms that may be utilized, in wireless environments with a high density of wireless devices, to help match vendors of goods and services to potential customers. For example, aspects of the present disclosure provide a physical (PHY) and/or media access control (MAC) layer signaling protocol to facilitate discovery, communications, and relaying, not only of goods and services offered, but goods and services desired by users.

As will be described in greater detail, device manufacturers may make such a protocol available to application designers via an application programming interface (API) that allows access to the discovery mechanism and information. Such an API may facilitate customization and creation of applications (apps) that make use of the available D2D services enabled by this system. Such apps may be vendor specific or general purpose (e.g., for presentation, profile manipulation, alert customization, and the like). In other words, the API described herein may provide discovered information to apps, which allows a user to personalize what expressions they wish to be alerted about, and also control what information is advertised (for others to discover).

FIG. 1 illustrates an example environment 100, in which vendors 102 may benefit by peer-to-peer relaying of discovery information by a user 104 to expand their effective coverage area, using aspects of the present disclosure. As an example, a user 104 within the actual coverage area of a vendor 102 may discover information regarding goods (and/) or services provided by vendor 102.

The user 104 may then move, within a discoverable range of a user 106 who is outside the actual coverage area of vendor 102. The user 104 may then relay the information regarding goods or services provided by vendor 102 with user 106, in effect, referring user 106 to vendor 102 for those goods or services.

As will be described in greater detail below, in some cases, user 104 may receive some form of compensation if the referral results in a transaction. For example, user 104 may receive credits or actual/virtual currency redeemable at vendor 102 (and/or some other vendor) for goods or services. The transaction may be executed at vendor 102 or, in some cases, at device 104 (e.g., via transfer of a credit, voucher, digital media or digital rights).

User 104 may use any suitable mechanism (or mechanisms) to discover information from vendor 102 and to share the discovered information with user 106. One example of such a mechanism is referred to as long term evolution (LTE) Direct (LTE-D) discovery. LTE-D enables a device to autonomously discover devices and their services in the proximity of the device. LTE-D uses LTE spectrum and infrastructure, which may allow mobile operators to offer a range of differentiated applications and services to users.

LTE-D is just one example of a type of mechanism that may be used for performing discovery as described herein.

Figure 1A:
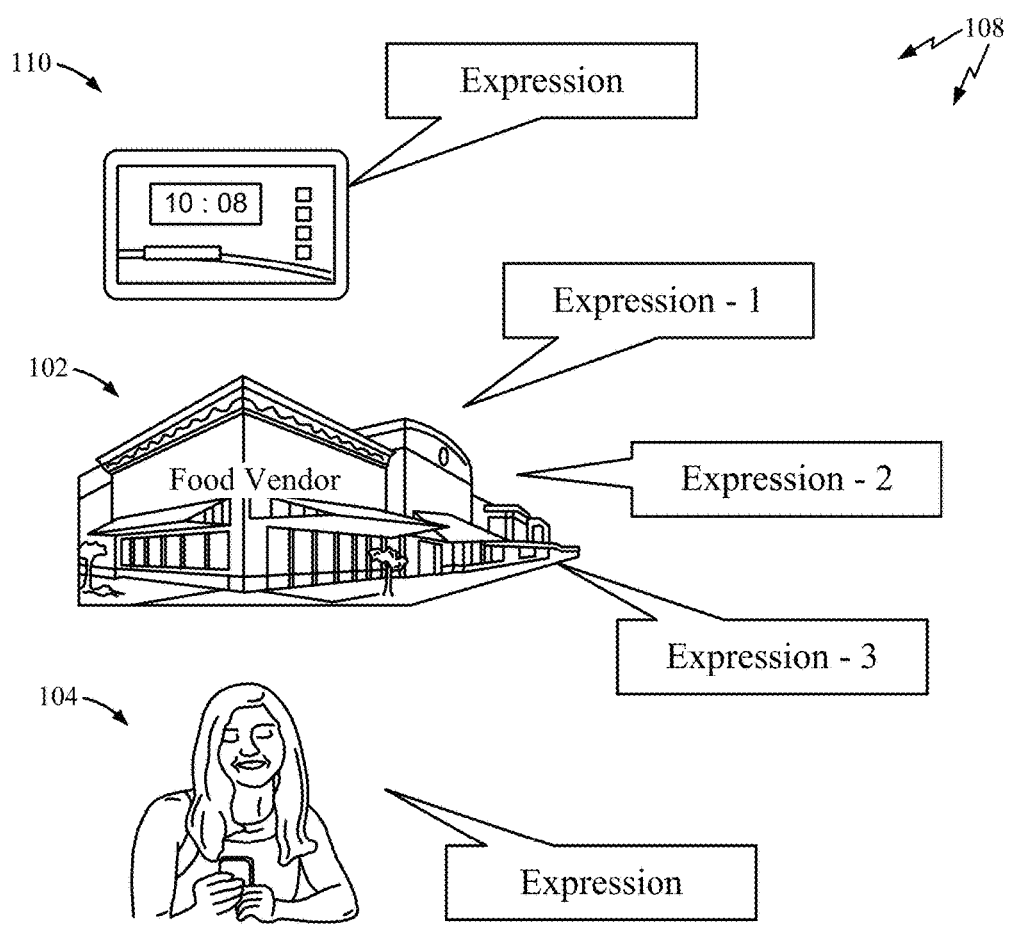

As illustrated in FIG. 1A, discovery of goods and services (e.g., LTE-D discovery) may involve detecting "expressions" transmitted by various devices, such as an access point/base station of a vendor 102 or mobile device 110 of a user 104, who is a potential customer of vendor 102.

As note above, the term "expression" generally refers to a transmission sent from a device that includes information allowing discovery of that device and/or goods or services provided by that device. In addition, an expression may broadcast a set of one or more goods and/or services of interest (e.g., needed or desired) by a user. Thus, aspects of the present disclosure may help match users looking for certain goods or services to corresponding vendors.

In other words, an expression may be used to convey any suitable type of information, such as advertising goods/services for sale, knowledge of another user's goods/services for sale, or a user's own personal interest in goods/services using expressions.

In some cases, an expression may include a service identifier (e.g., 64 or 128 bit) for each service or good offered by a vendor (or device or user). As will be described below, in some cases a relay device may make decisions regarding whether or not to relay an original expression based on a match between a good or service indicated by the original expression and a good or service indicated by an expression transmitted by a potential recipient of the relayed expression. This may be referred to herein as targeted relaying, an attempt to relay information that is of particular interest to a recipient.

Example Expression Registration

Figure 2A:
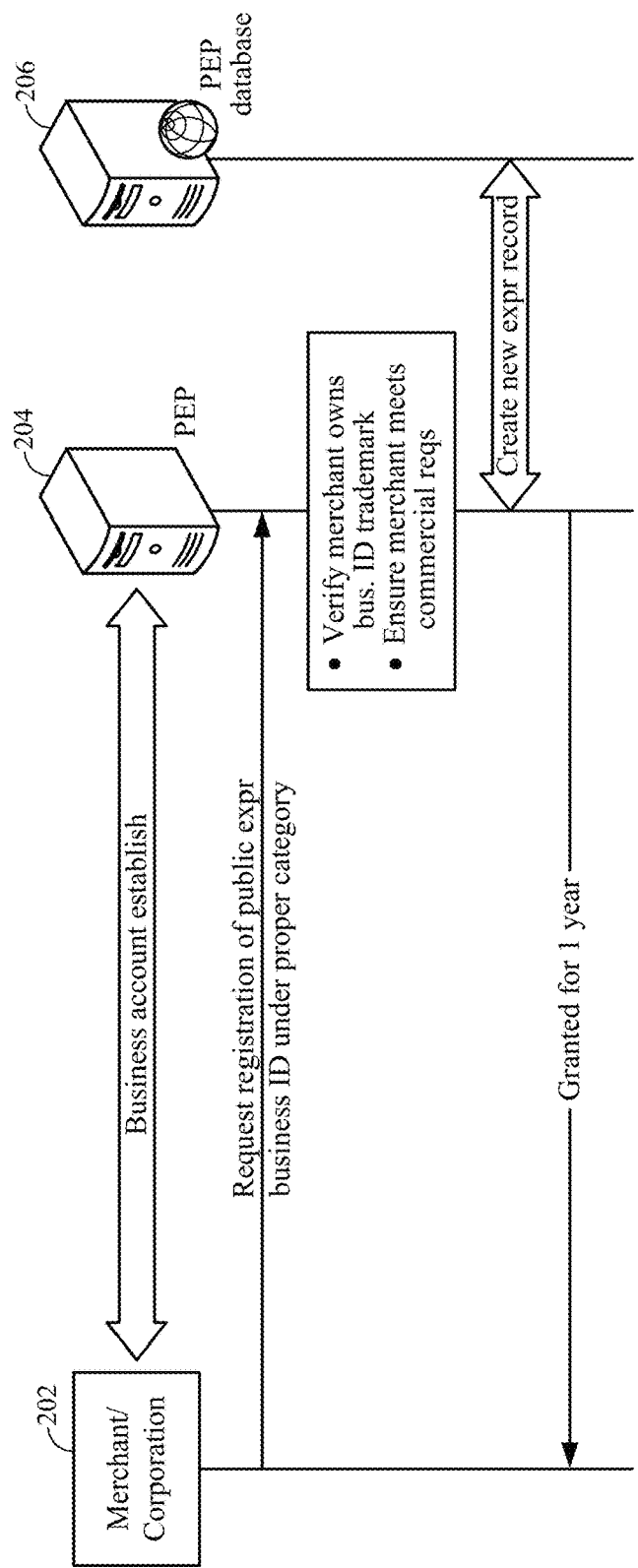
FIGS. 2A-2C illustrate examples of expression assignment and management, in accordance with aspects of the present disclosure.

In some cases, to help ensure expressions are unique (e.g., with unique service identifiers), expressions may be registered. FIG. 2A illustrates an example of how expressions may be registered. As illustrated, a vendor 202 (e.g., a merchant/corporation "registrant") may establish an account via a server 204, referred to herein as a public expression provider (PEP).

The registration may be for a particular business ID or an application ID and may be made under a particular commercial category (e.g., lodging, entertainment, food, etc.). The PEP may perform various actions, such as verifying the merchant owns the corresponding business ID and ensuring the merchant meets certain commercial requirements. This step may be followed by a procedure to assign an expression prefix (Expression Name/Code) to a particular device (e.g., belonging to the merchant), which may involve utilization of a ProSe Application, for example, designed to ensure uniqueness for later validation and verification checks.

As illustrated, once registered, an entry may be created in a PEP database 206 that tracks registered expression IDs. In this manner, registering via the PEP may be similar, in some ways, to registering a domain name. In some cases, the registration may be for a fixed period of time (e.g., for a year) and subject to renewal.

Figure 2B:
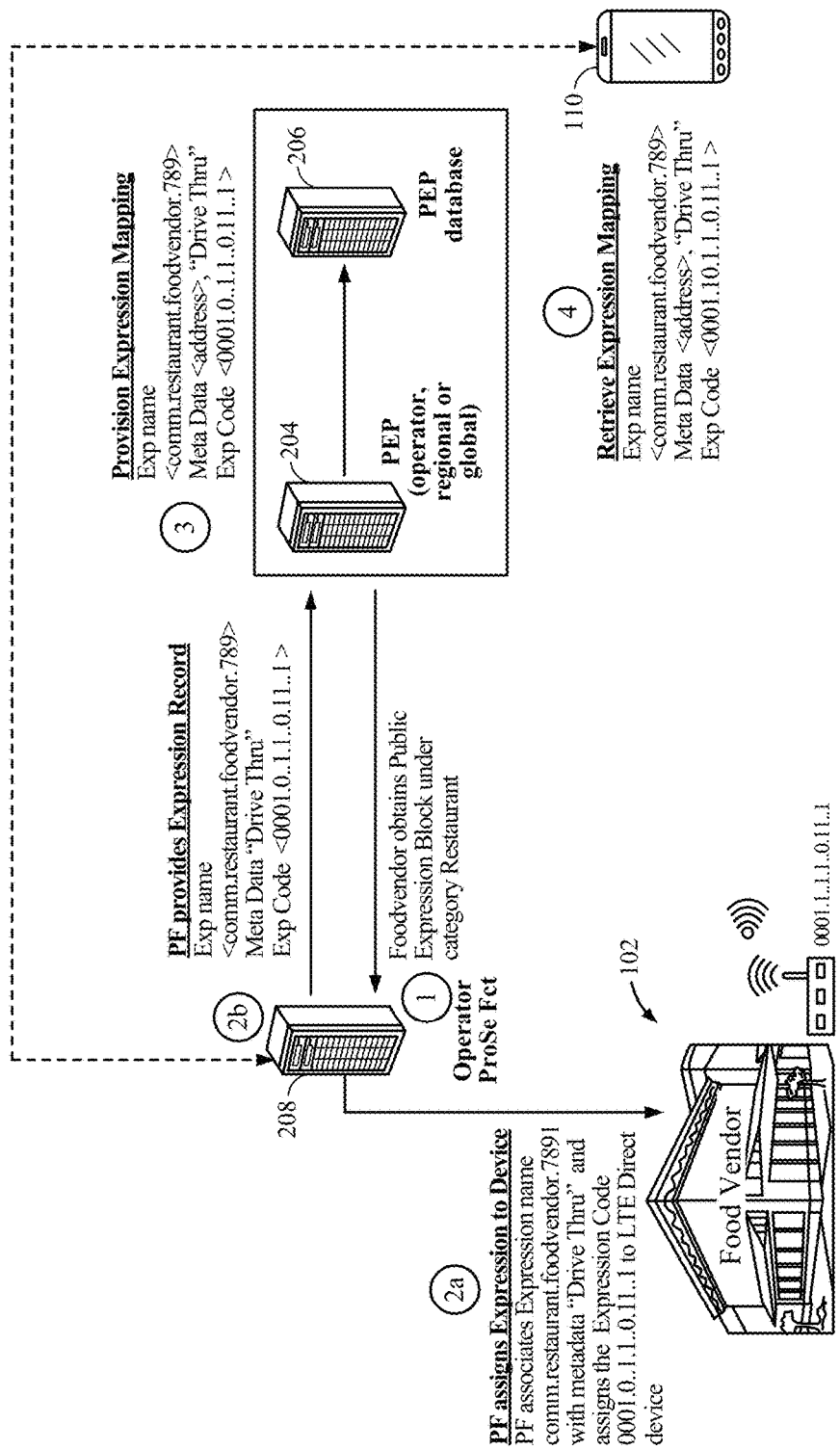

FIG. 2B illustrates how a registered expression may be used, in sequential operations, for an example vendor ("FoodVendor"). At (1), the vendor obtains a Public Expression Block under category Restaurant. At (2a), a ProSe Function (PF) associates an Expression name (comm.restaurant.foodvendor.7891), in this example, with metadata "Drive Thru" and assigns an Expression Code (0001.0..1.1..0.11..1) to a vendor device (e.g., an access point at the drive thru location). As illustrated, an Expression name may be a bitstring that describes the advertised goods or services at different levels (e.g., category, name, and metadata, such as location). In this manner, an expression may represent an identity, location, service, interest and allow for discovery by others in its proximity.

At (2b), the PF provides a record of the Expression to PEP server 204 and PEP database 206, while providing a mapping of the Expression name, Expression Code, and metadata, at (3). At (4), a mobile device 110 retrieves the expression mapping, which allows it to discover the corresponding services if it detects Expression Code broadcast by the vendor.

Figure 2C:
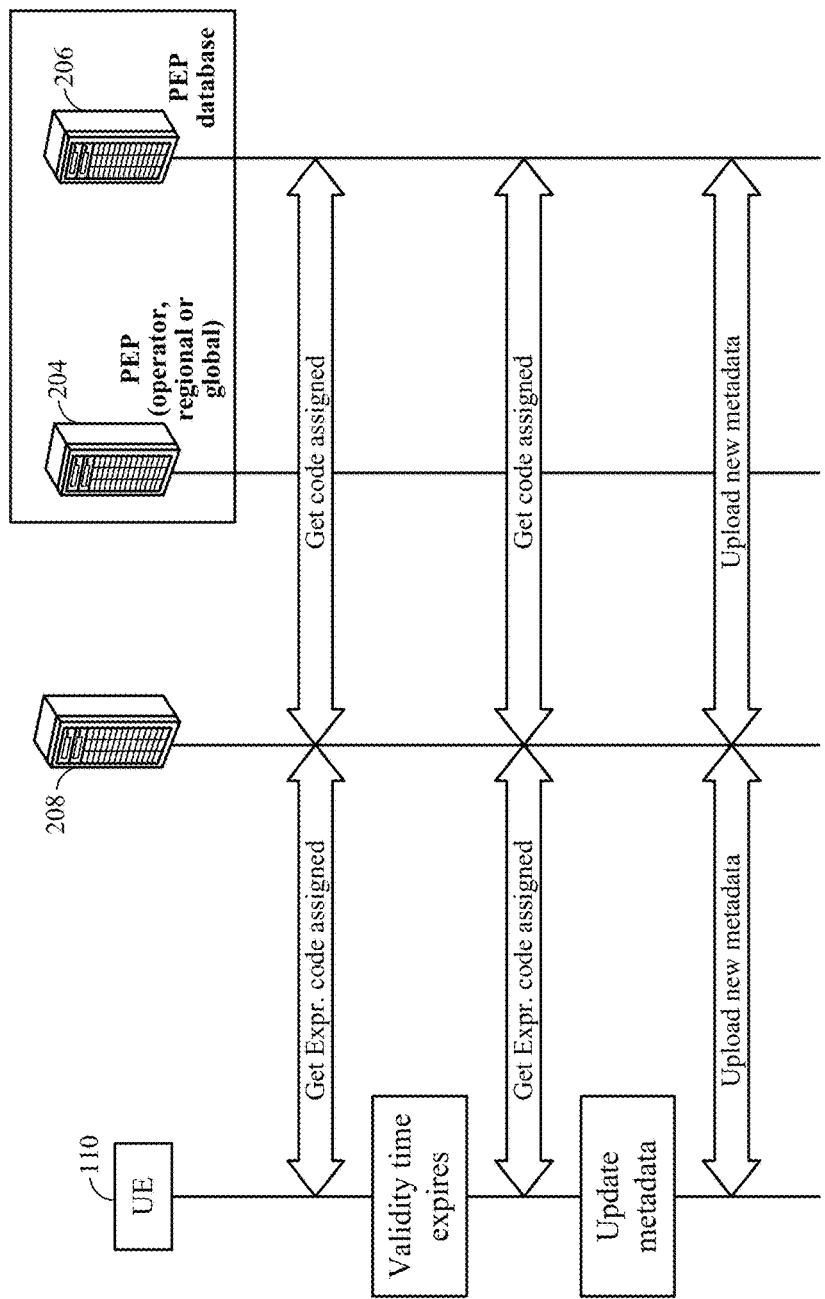

FIG. 2C illustrates an example of how expressions may be managed. As described above, a full or partial expression name (and code) may be assigned to a particular UE 110, for example, by an operator PF 208, using available expression namespace, which may have operator-scope, regional-scope, or global-scope, as defined by the PEP 202, with a record of the assignment stored in PEP database 206. As noted above, the assignment may be valid for a defined period of time.

After this validity time expires, the assignment may be renewed. In this case, the UE may receive a new code for the same expression (as it continues to be the owner), and the PEP database 206 may be updated accordingly. In addition, the PEP database 206 may be updated if there are any changes to the metadata associated with the assigned expression (e.g., category, name, or location).

In some cases, metadata associated with an expression may include whether the assignee of the expression has granted permission to relay the expression. For example, the metadata may include an element <relayable> that might be set to "false" by default, but the owner can set to "true" to allow the expression (or at least certain indicated field) to be relayed. A UE detecting this expression may then look up the metadata to see whether it can be relayed or not.

In some cases, granting permission to relay may involve application-layer signaling between a UE interested in relaying and the owner of the expression. In some cases, when a UE detects this expression, it may set up a connection (e.g., a WAN or direct connection) with the announcer via an app, which may be indicated in metadata. In this manner, the announcer may be able to know the identity of the UE wishing to relay (and can decide whether or not to grant permission).

Example Expression Discovery

As described above, an expression may be used to facilitate discovery of any suitable type of information, such as advertising goods/services for sale, knowledge of another user's goods/services for sale, or a user's own personal interest in goods/services. Any suitable wireless communications technology may be used for expression-based discovery, which may leverage existing infrastructure.

Figure 3:
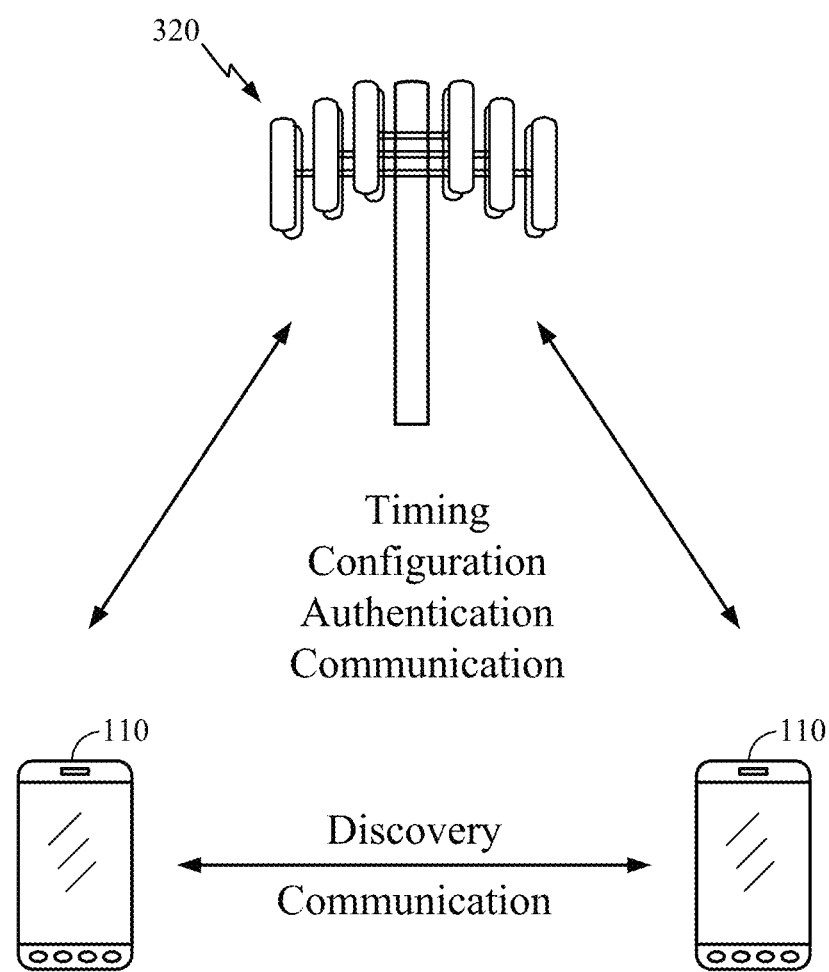
FIG. 3 illustrates an example peer-to-peer communication mechanism, which may be utilized in accordance with aspects of the present disclosure.

For example, as illustrated in FIG. 3, UEs 110 may be able to perform LTE-D based discovery, taking advantage of existing LTE structure. This may result in efficient discovery and ensuing data connectivity (between devices) may be either through a LTE network (e.g., between UEs 110 and a base station 320) or directly through LTE Direct. This approach may leverage the existing LTE network infrastructure, for example, for timing, resource allocation (to LTE Direct), as well as user authentication.

Figure 4:
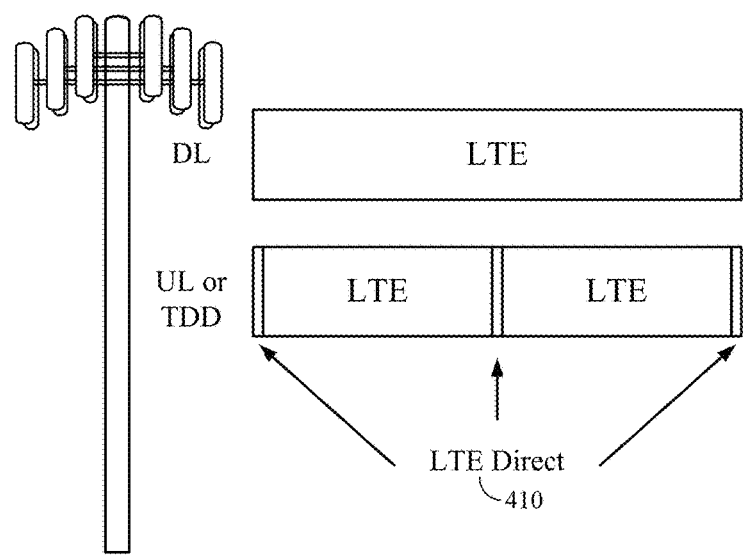
FIG. 4 illustrates example resources that may be allocated for peer-to-peer discovery, in accordance with aspects of the present disclosure.
Figure 5:
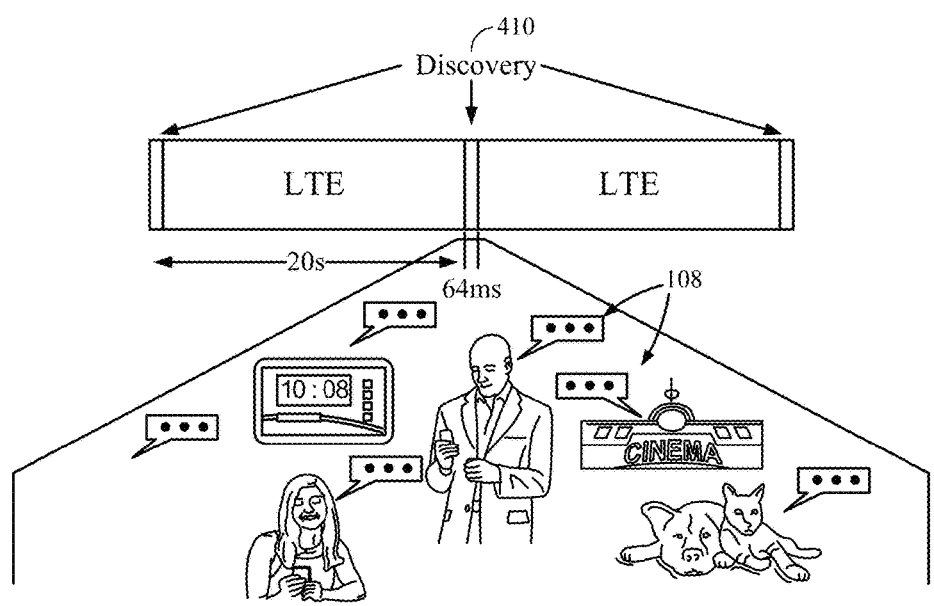
FIG. 5 illustrates how resources shown in FIG. 4 may be used for discovery of different devices, in accordance with aspects of the present disclosure.

As illustrated in FIGS. 4 and 5, portions 410 of uplink (UL) LTE resources may be allocated for LTE-D communications (e.g., discovery via expressions 108). This portion may be a portion of UL bandwidth in an LTE frequency division duplex (FDD) system or dedicated frames in a LTE time division duplex (TDD) system. The amount of resources allocated for LTE-D may be relatively small, resulting in little impact on conventional LTE operation.

Figure 6:
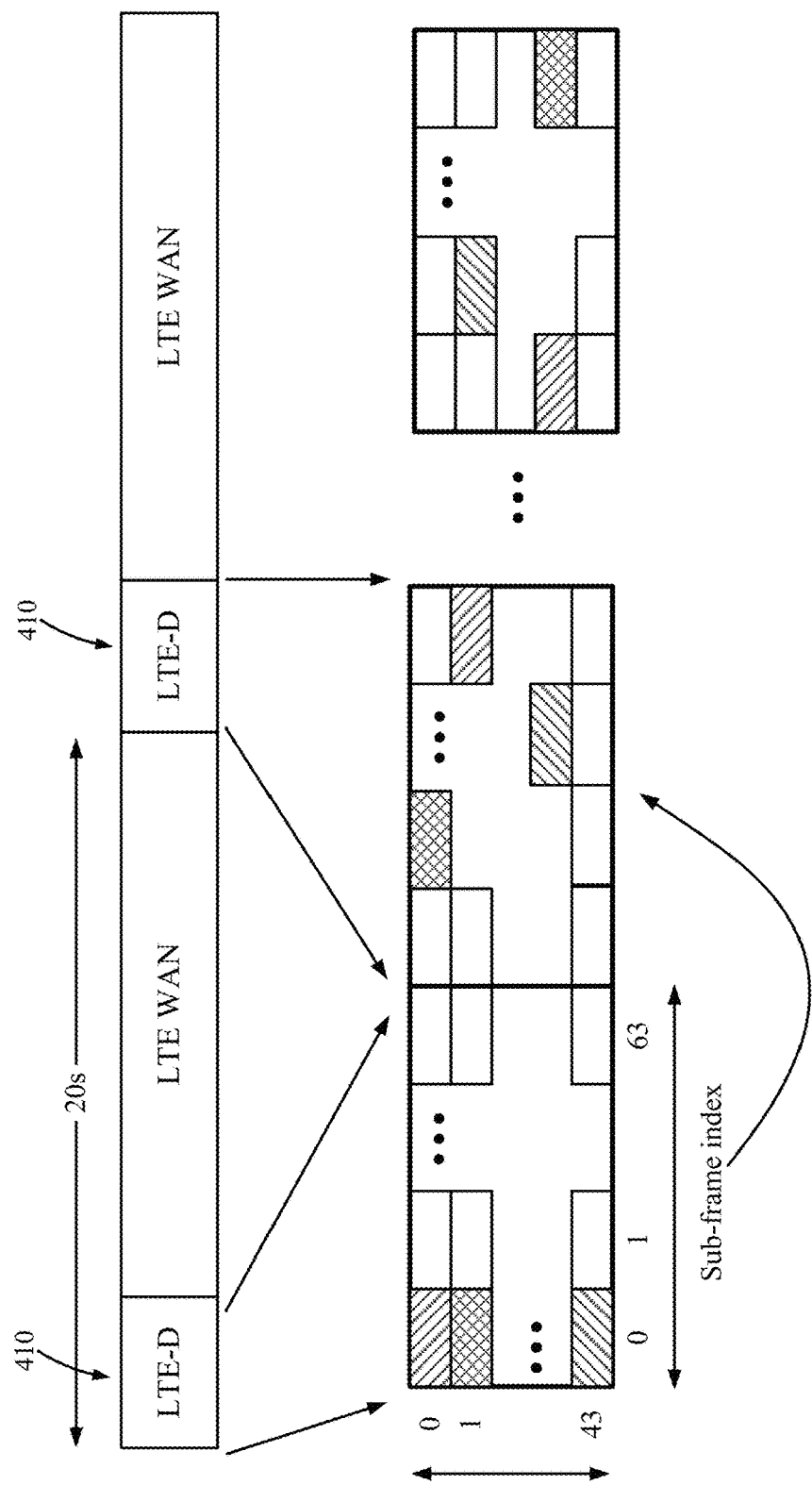
FIG. 6 illustrates how resources shown in FIG. 5 may be partitioned among different devices, in accordance with aspects of the present disclosure.

For example, as illustrated in FIG. 6, 64 subframes (64 ms assuming 1 ms subframes) periods may be allocated for LTE-D, while 20 s periods (2000 subframes) may be reserved for conventional LTE communications. FIGS. 7A-7F provides greater detail about how resource blocks within the 64 subframes may be allocated to support discovery transmissions by several different users.

LTE-D based discovery is just one example of a suitable mechanism for discovery and other mechanisms may also be used. For example, according to certain aspects, discovery may be performed on a wireless local area network (WLAN). In some cases, discovery may be performed on a common (unlicensed) channel, rather than a licensed channel. In such a case, a wide area network (e.g., 3G, UMTS, 4G, or 5G) may be used to provide common timing to synchronize discovery on the unlicensed channel. In some cases, UEs 110 may be preconfigured with information to use for LTE-D, for example, in a UEs encrypted file system (EFS). Preconfigured UEs may include band and channel information for channels not in use by operators in a particular geographical area and preconfigured UEs may utilize these unused bands and channels to perform LTE-D discovery. Discovery may be performed on channels used by a wide area network when those channels are not being actively used by the WAN, such as a channel used for carrier aggregation or a downlink-only band.

Example Discovery Frame Formats

Figure 7A:
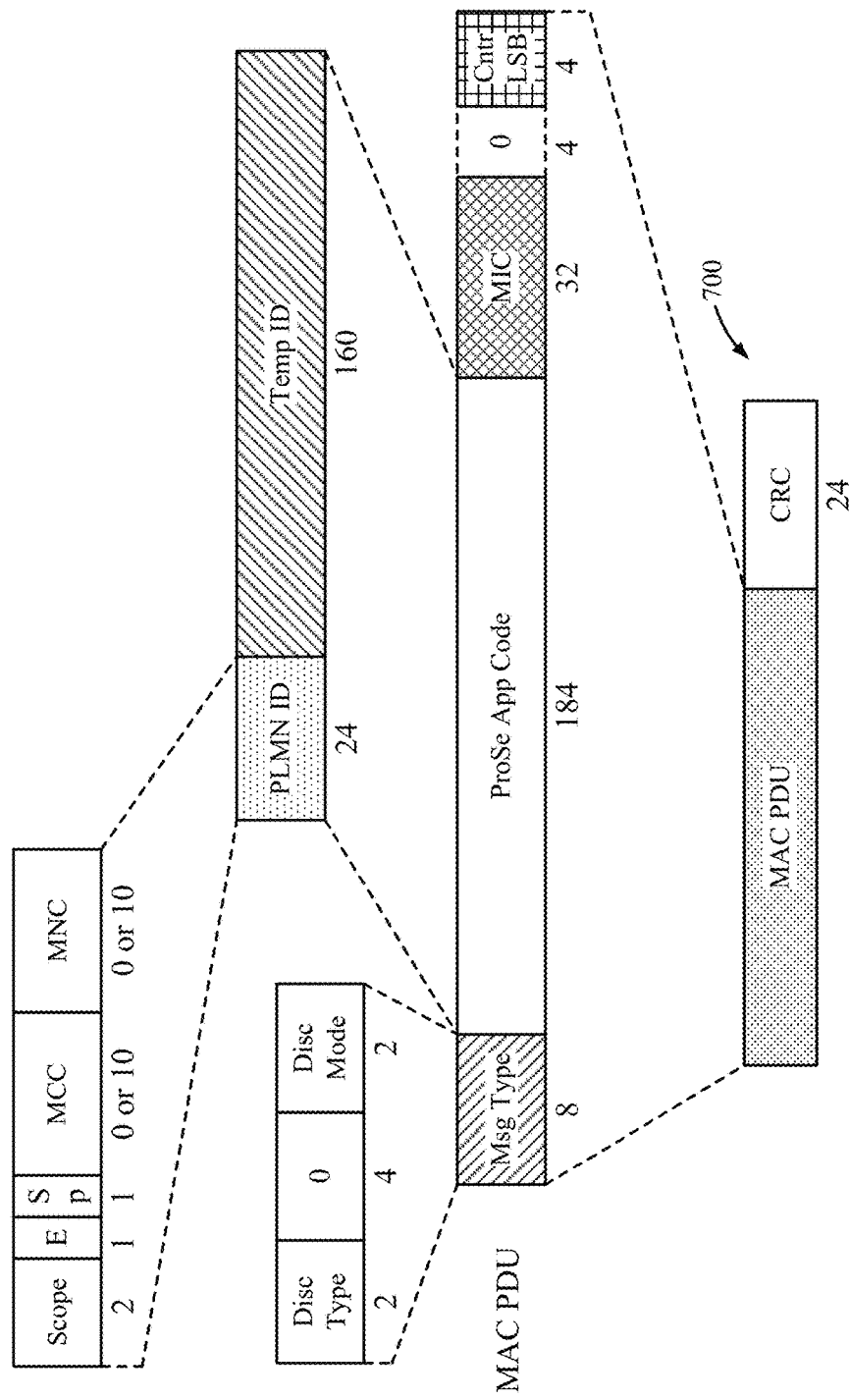
FIG. 7A-7C illustrate example discovery frame formats and devices capable of communicating using such formats, in accordance with aspects of the present disclosure.
Figure 7B:
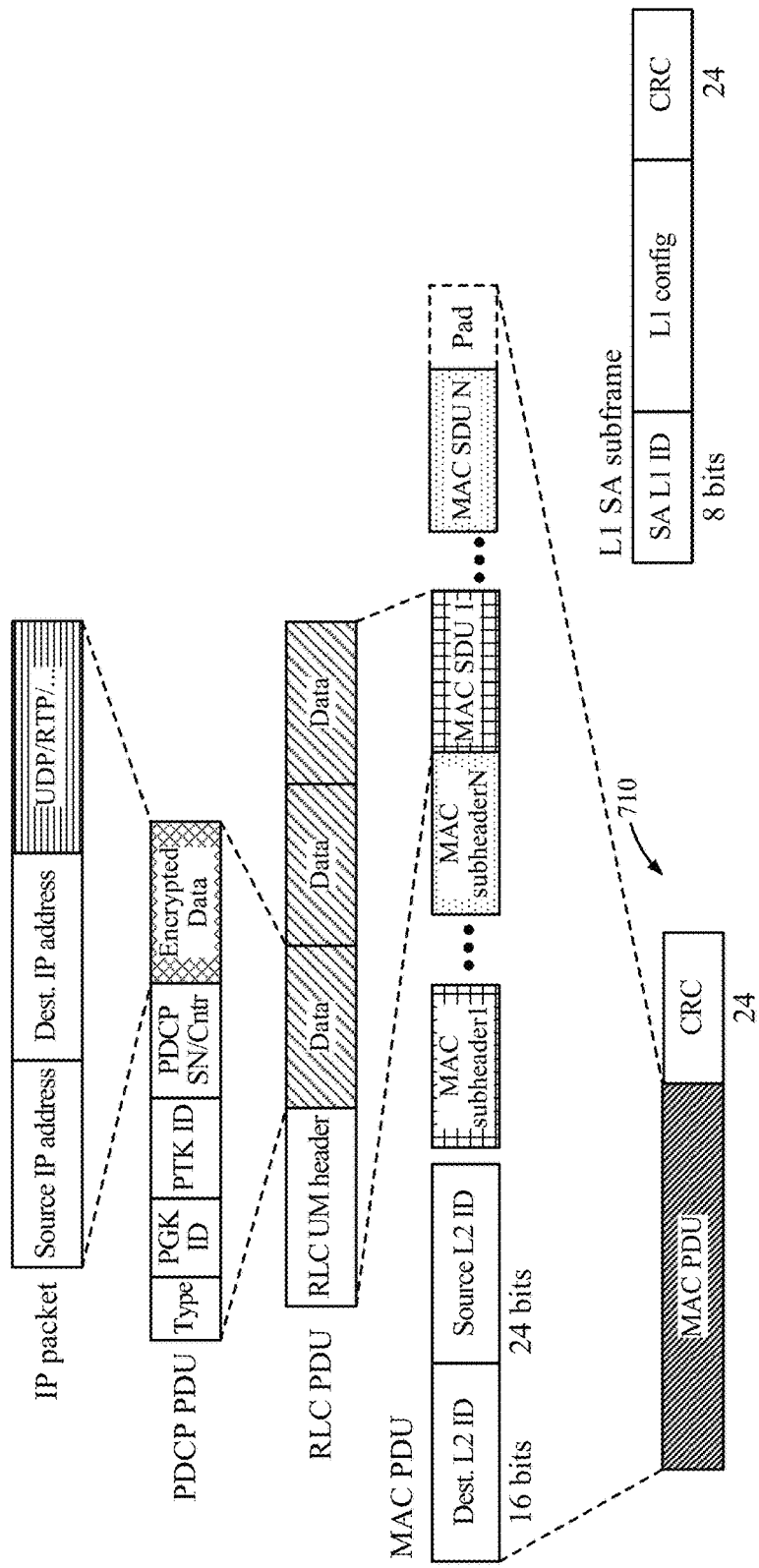
Figure 7C:
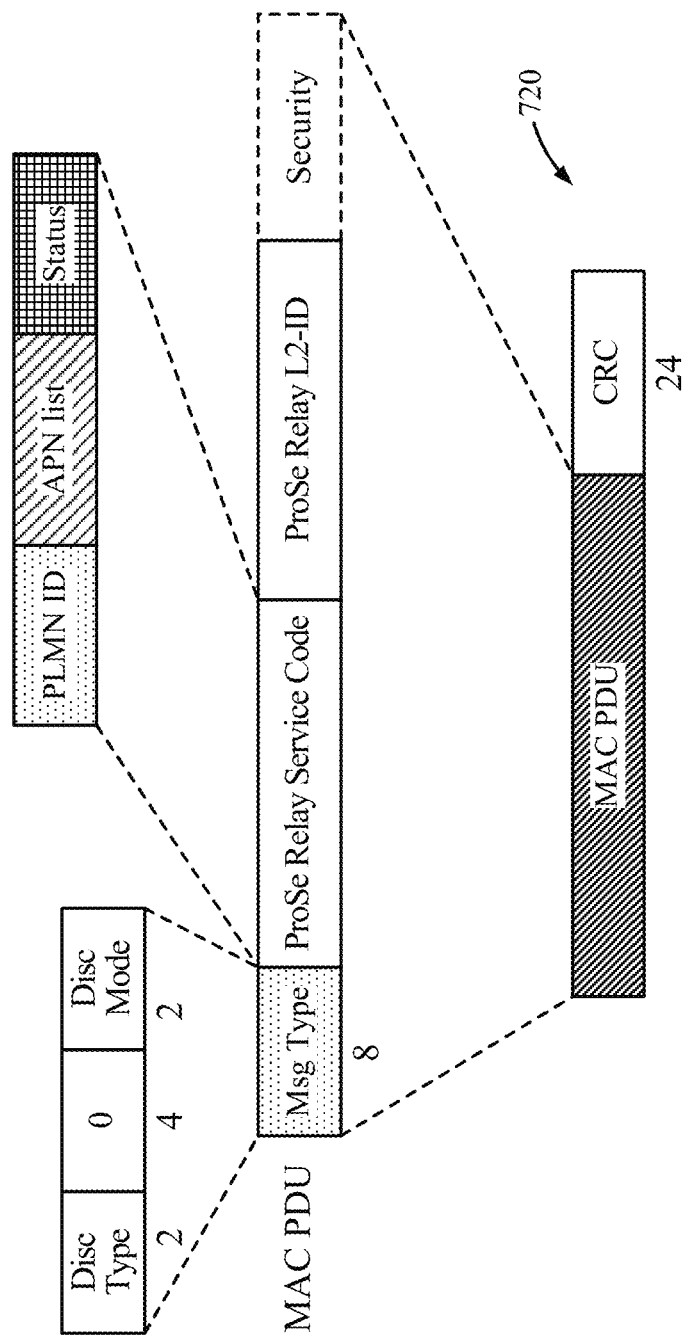

In general, expressions may be transmitted as discovery frames of any suitable format. UEs participating in discovery may have suitable PHY and MAC layers configured to generate and process discovery frames (e.g., of a suitable MAC packet format). FIGS. 7A-7C illustrate example discovery frame formats, which may include formats suitable for multicast and unicast, as well as relay frame formats that accommodate credit assignment capability (single hop, multi-hop). The frame formats illustrated in FIGS. 7A-7C may be used, for example, in the various discovery and relaying examples provided herein. Byte lengths shown under certain fields are exemplary only and actual byte lengths of different fields may vary.

FIG. 7A illustrates a first example discovery frame format 700 of a MAC packet. As illustrated, the packet may have a MAC protocol data unit (PDU) protected by a cyclic redundancy check (CRC). The MAC PDU components may include various fields, such as fields for a Msg Type, ProSe App Code, MIC, and time calibration information (e.g., LSBs of a counter). As illustrated, the MsgType field may include Discovery Type and Discovery Mode subfields, for example, which may be used to specify whether discovery is open or restricted. Open discovery may intrinsically require no permission control on who can monitor for the announced public expressions, while restricted discovery may require application/user-level permission.

The ProSe App Code field may include a public land mobile network (PLMN) ID field, with a mobile country code or mobile network (MCC/MNC) subfield, a Scope subfield that indicates if the Temporary ID is PLMN, country-wide, or global (e.g., and a field "E" that indicates whether the MCC and MNC are included), and the Temporary ID. The Temporary ID may indicate various application-layer information useful in processing the packet.

The MIC and time calibration fields may be used for verification by ProSe function during Match Reports. As will be described in greater detail below, a monitoring UE may need to figure a right time value that was used to compute the MIC and pass that along to ProSe Function. In this regard, the time calibration information may help, as these may be least significant bits (LSBs) of the UTC-based counter used in the MIC computation. According to other aspects, instead of a time-calibration parameter, a counter, sequence number, or random number ("nonce") may be used instead to impart freshness to the compute MIC value.

FIG. 7B illustrates an example frame format 710 for a multicast (1-to-many) transmission. In this example, the MAC PDU has destination and source ID fields and a plurality of MAC service data units (SDUs), each with a MAC subheader. Each SDU may carry a radio link control (RLC) PDU with one or more PDCP PDUs having an IP packet as an encrypted data payload. As illustrated, the IP packet may, in turn, have a Source IP address, Destination Address, and UDP/RTP data. An L1 Source Address subframe may have an SA L1 ID field and L1 configuration information. The L1 configuration information, for example, may include information such as a modulation and coding scheme (MCS), timing advance (TA), and time and frequency location of data.

FIG. 7C illustrates a first example relay discovery frame format 720 for a relayed packet (e.g., a discovery frame detected- and relayed by a relay device). As illustrated, the packet may have a MAC PDU protected by a CRC. The MAC PDU components may include various fields, such as fields for a Msg Type, ProSe Relay Service Code, a ProSe Relay L2 ID field, and possibly a security field. As with the format 700 of FIG. 7A, the MsgType field may include Discovery Type and Discovery Mode subfields.

In this example, the ProSe Relay Service Code field may include a PLMN ID field, access point name (APN) list field, and Status flags. The APN list may include a list of APNs that this relay provides connectivity to. The Status (or maintenance) flags may be used to indicate various conditions, such as whether the relay is temporarily without connectivity or battery running low, so the Remote UEs can seek/reselect another Relay, and whether it supports signaling for establishing additional packet data network (PDN) connections. The ProSe Relay Layer-2 ID field may be used as a Layer-2 ID for ProSe communication. The security field may include, for example, a MIC field and possible other fields, such as time calibration information. Such a field may not be useful for Public Safety out of coverage, but may be useful for various commercial use cases.

Figure 7D:
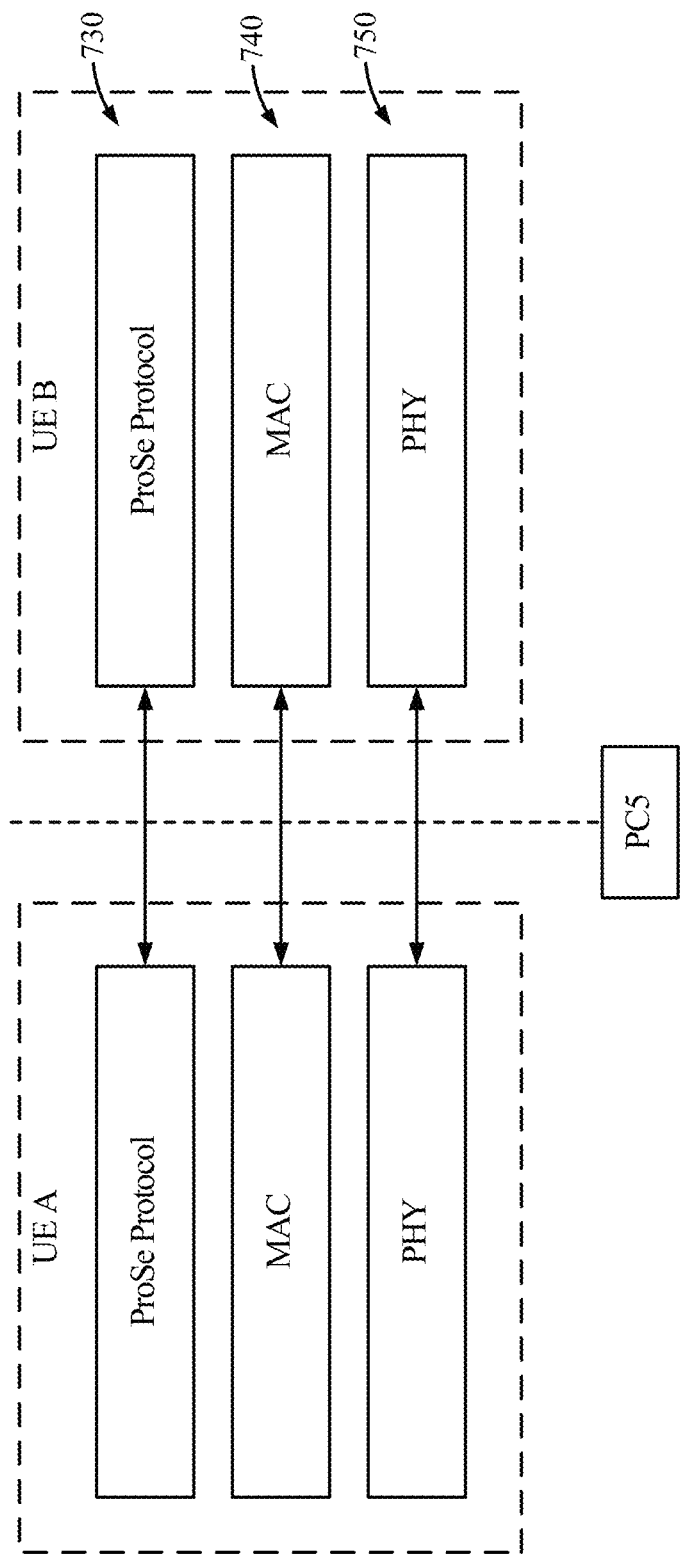
FIG. 7D illustrates an example architecture for processing and relaying discovery information, in accordance with aspects of the present disclosure.

FIG. 7D illustrates example UEs (UE A and UE B) capable of communicating via the frame formats illustrated in FIGS. 7A-7C. As illustrated, each UE may have components to communicate at the PHY layer 750, MAC layer 740, and ProSe Protocol layer 730. For example, with the PHY layer passing the MAC PDUs up to the MAC layer. In turn, the MAC layer may extract the ProSe Protocol information and pass it on the ProSe layer for processing.

PHY layer processing may include for ProSe Direct Discovery and ProSe Direct Communication between UEs may involve physical channel structures (referred to herein as "sidelink" channels), similar to those used for uplink transmissions, but with certain changes. For example, such sidelink transmissions may be limited to single cluster transmissions for all the physical channels. Further, such sidelink transmissions may use a single (1) symbol gap at the end of each sub-frame. The physical layer processing of transport channels may also differ from UL transmission in various steps. For example, scrambling for a physical sidelink data channel (PSDCH) and physical sidelink control channel (PSCCH), may not be UE-specific.

Further, modulation of 64 QAM may not be supported and control channels for such transmissions may be mapped to a particular set of control resources. Further, modulation for data and control channels for such transmissions may utilize reference signals similar to uplink demodulation reference signals (e.g., transmitted in the 4-th symbol of the slot in normal CP and in the 3rd symbol of the slot in extended cyclic prefix). These demodulation reference signals sequence lengths may equal the size (number of sub-carriers) of the assigned resource and may be created based on a fixed base sequence, cyclic shift and orthogonal cover code. For in-coverage operation, the power spectral density of such transmissions may be influenced by the eNB.

MAC layer processing may include processing of a discovery channel. Content of discovery information may be transparent to Access Stratum (AS) and there may be no distinction made in AS for ProSe Direct Discovery models and types of ProSe Direct Discovery. The UE may participate in announcing and monitoring of discovery information in both idle and connected states, as per eNB configuration. The UE may announce and monitor its discovery information subject to the half-duplex constraint (e.g., using resource allocation as shown in FIGS. 4-6).

A UE that participates in announcing and monitoring may maintain the current UTC (coordinated universal) time. The UE that participates in announcing transmits a discovery message (e.g., according to one of the formats described above), which is generated by the ProSe protocol taking into account the UTC time upon transmission of the discovery message. In a monitoring UE, the ProSe protocol provides the message to be verified together with the UTC time upon reception of the message to the ProSe function.

Radio Protocol Stack (AS) processing for ProSe Direct Discovery may involve only MAC and PHY layers. The AS layer may perform various functions. The AS layer may interfaces with upper layer (ProSe Protocol). For example, the MAC layer may receive the discovery information from the upper layer (ProSe Protocol). The IP layer may not used for transmitting the discovery information. For scheduling, the MAC layer may determine the radio resource (e.g., per FIG. 6) to be used for announcing the discovery information received from upper layer. For discovery PDU generation, the MAC layer may build the MAC PDU carrying the discovery information and sends the MAC PDU to the physical layer for transmission using the determined radio resource (e.g., with no MAC header added).

While the frame format 700 shown in FIG. 7A may be used in LTE D2D discovery, various other frame formats may be used to participate in discovery (and relaying of discovery information) using different radio access technologies (RATs).

Figure 7E:
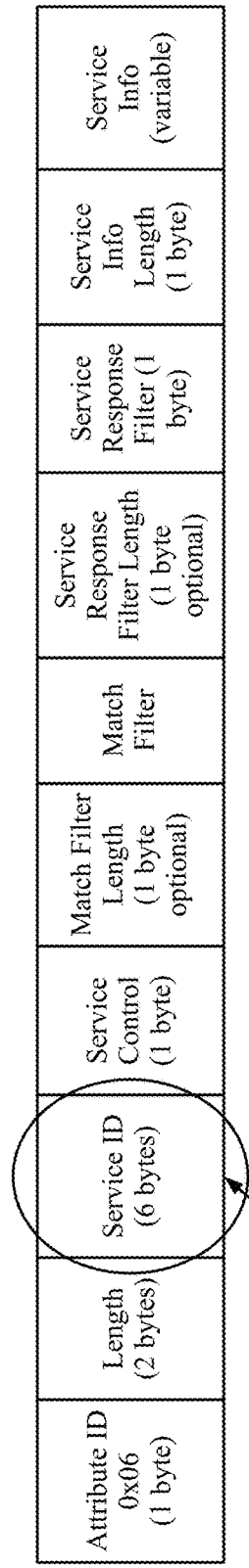
FIGS. 7E-7F illustrate example discovery frame formats and devices capable of communicating using such formats, in accordance with aspects of the present disclosure.

For example, FIG. 7E illustrates an example discovery frame format 760 that may be used for communicating via a local area network (e.g., Wi-Fi), such as a neighbor aware network (NAN). As illustrated, the frame may have an Attribute ID, Length field, Service ID, and Service Control Fields. In some cases, the Service ID may carry discovery information. For example, the Service ID may be generated as a hash of a corresponding domain name and, in some cases, may carry a user ID or code. As illustrated, the frame may also include other fields, such as a Match Filter Length, Match Filter, Service Response Filter Length, Service Response Filter, Service Info Length, and Service Info fields. The Service Info field may be of variable length and may carry various types of service discovery information.

Figure 7F:
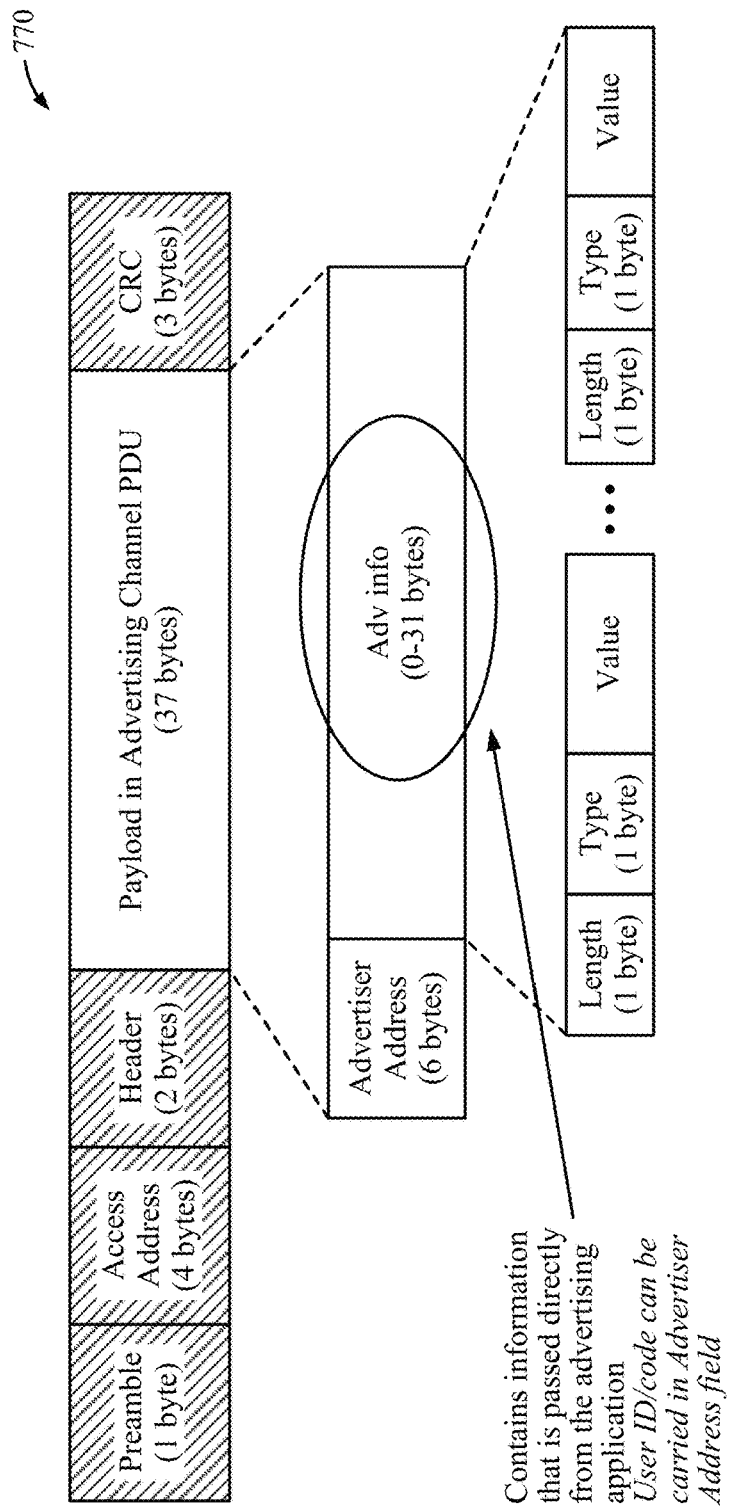

FIG. 7F illustrates an example discovery frame format 770 that may be used for communicating via a close proximity RAT, such as Blue Tooth Low-Energy (BTLE). As illustrated, the frame may have a preamble, access address, and header fields. Discovery information may be provided as payload (e.g., in an Advertising Channel PDU). As illustrated, the payload may include an advertiser address field (which may carry a User ID/code), as well as various advertising information that may include information that is passed directly from an advertising application. Different types of advertising information may be separated in data units, each having length, type, and value fields.

Figure 8:
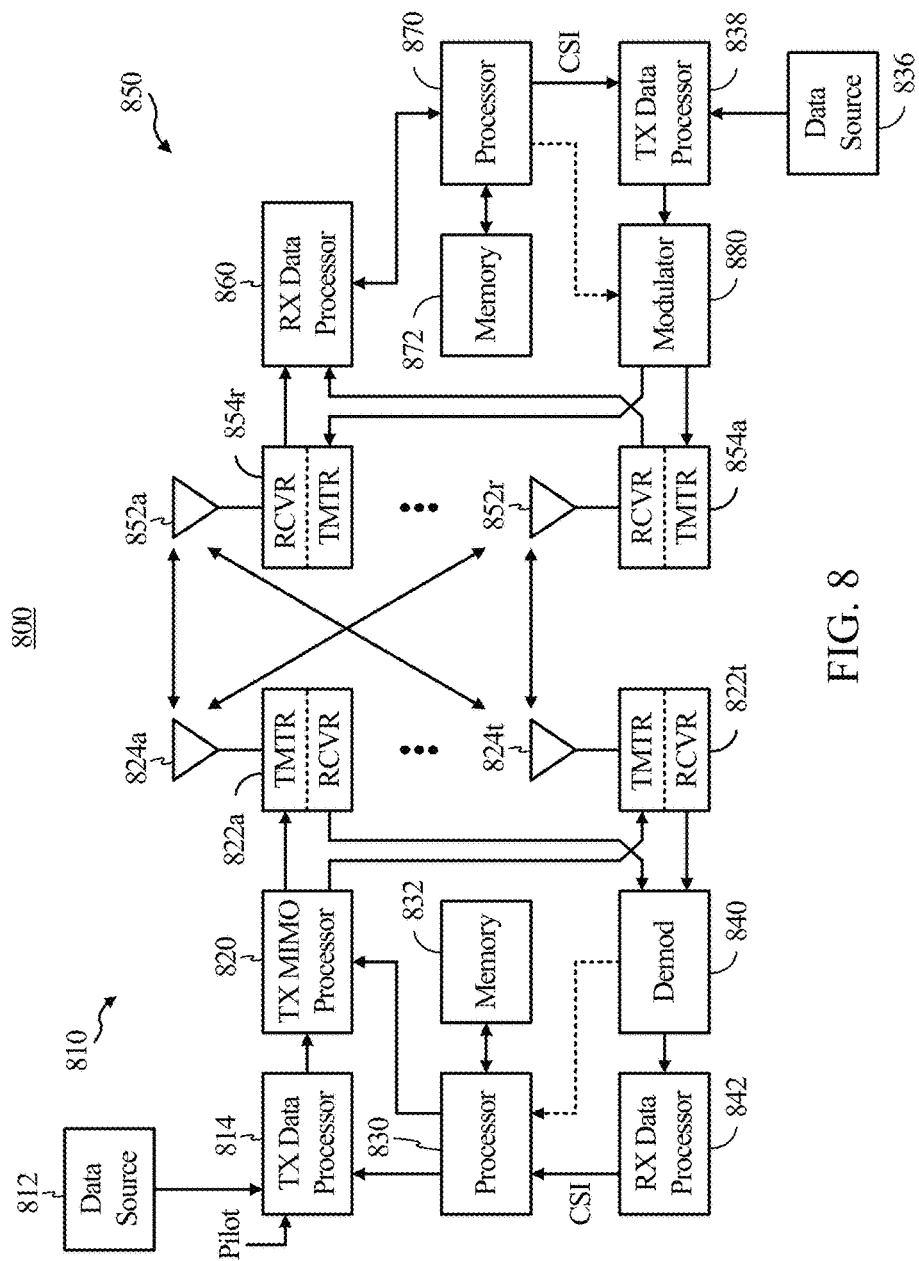
FIG. 8 illustrates example components, which may be used to implement aspects of the present disclosure.

FIG. 8 illustrates example components of the base station 110 and UE 120 illustrated in FIG. 1, which may be used to implement aspects of the present disclosure. One or more components of the BS 110 and UE 120 may be used to practice aspects of the present disclosure.

Referring initially to the device 110, traffic data for a number of data streams is provided from a data source 812 to a transmit (TX) data processor 814. Each data stream is then transmitted over a respective transmit antenna.

The TX data processor 814 formats, codes, and interleaves the traffic data for each data stream based on a particular coding scheme selected for that data stream to provide coded data. The coded data for each data stream is multiplexed with pilot data using OFDM techniques or other suitable techniques. The pilot data is typically a known data pattern that is processed in a known manner and used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream are typically determined by instructions performed by a processor 830. A memory 832 stores program code, data, and other information used by the processor 830 or other components of the device 110.

The modulation symbols for all data streams are then provided to a TX MIMO processor 820, which further processes the modulation symbols (e.g., for OFDM). The TX MIMO processor 820 then provides NT modulation symbol streams to NT transceivers (XCVR) 822A through 822T. In some aspects, the TX MIMO processor 820 applies beam-forming weights to the symbols of the data streams and to the antenna from which the symbol is being transmitted.

Each transceiver 822 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 822A through 822T are then transmitted from NT antennas 824A through 824T, respectively.

At the device 120, the transmitted modulated signals are received by NR antennas 852A through 852R and the received signal from each antenna 852 is provided to a respective transceiver (XCVR) 854A through 854R. Each transceiver 854 conditions (e.g., filters, amplifies, and downconverts) a respective received signal, digitizes the conditioned signal to provide samples, and further processes the samples to provide a corresponding "received" symbol stream.

A receive (RX) data processor 860 then receives and processes the NR received symbol streams from NR transceivers 854 based on a particular receiver processing technique to provide NT "detected" symbol streams. The RX data processor 860 then demodulates, deinterleaves, and decodes each detected symbol stream to recover the traffic data for the data stream. The processing by the RX data processor 860 is complementary to that performed by the TX MIMO processor 820 and the TX data processor 814 at the device 110.

A processor 870 periodically determines which precoding matrix to use (discussed below). The processor 870 formulates a reverse link message comprising a matrix index portion and a rank value portion. A memory 872 stores program code, data, and other information used by the processor 870 or other components of the device 120.

The reverse link message comprises various types of information regarding the communication link and/or the received data stream. The reverse link message is processed by a TX data processor 838, which also receives traffic data for a number of data streams from a data source 836, modulated by a modulator 880, conditioned by the transceivers 854A through 854R, and transmitted back to the device 110.

At the device 110, the modulated signals from the device 120 are received by the antennas 824, conditioned by the transceivers 822, demodulated by a demodulator (DEMOD) 840, and processed by a RX data processor 842 to extract the reverse link message transmitted by the device 120. The processor 830 then determines which precoding matrix to use for determining the beamforming weights by processing the extracted message.

In some implementations, the receive data processor 860 and/or the processor 870 performs the handover parameter adaptation operations described herein. It should be appreciated that these operations may be performed in cooperation with other components of FIG. 8 and/or by other components of FIG. 8 in some implementations.

Figure 9:
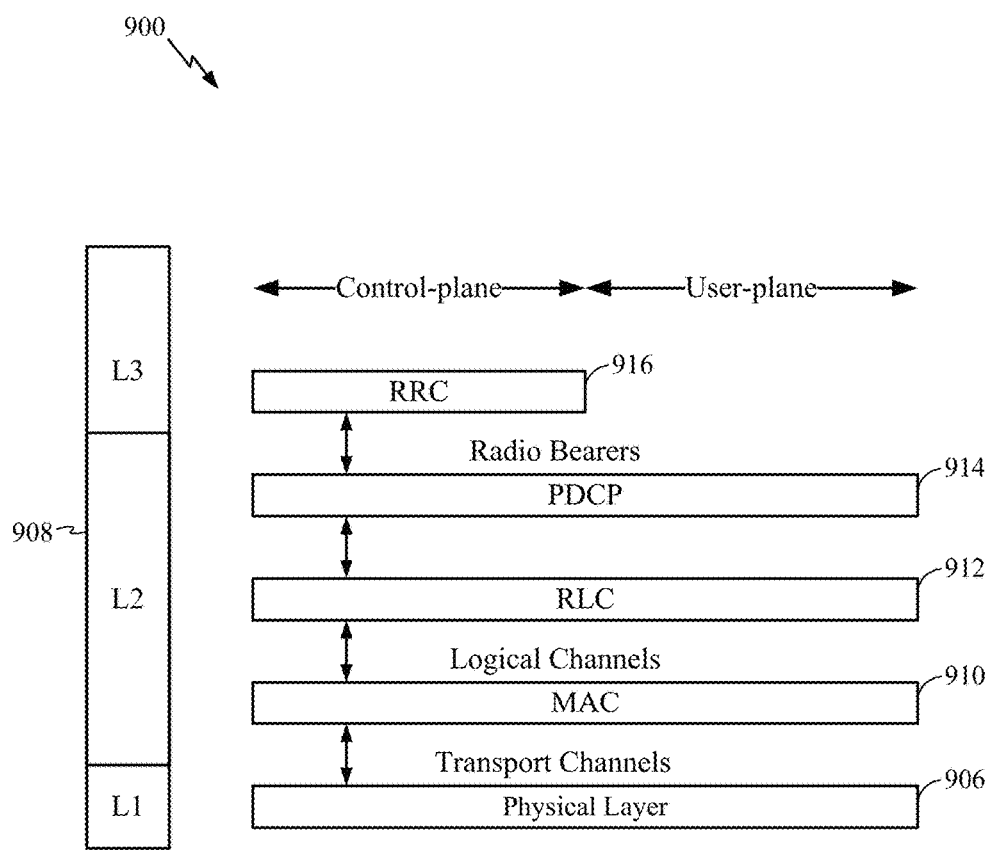
FIG. 9 is a diagram illustrating an example of a radio protocol architecture for the user and control planes in LTE.

FIG. 9 is a diagram 900 illustrating an example of a radio protocol architecture for the user and control planes in LTE. The radio protocol architecture for the UE and the BS is shown with three layers: Layer 1, Layer 2, and Layer 3. Layer 1 (L1 layer) is the lowest layer and implements various physical layer signal processing functions. The L1 layer will be referred to herein as the physical layer 906. Layer 2 (L2 layer) 908 is above the physical layer 906 and is responsible for the link between the UE and BS over the physical layer 906.

In the user plane, the L2 layer 908 includes a media access control (MAC) sublayer 910, a radio link control (RLC) sublayer 912, and a packet data convergence protocol (PDCP) 914 sublayer, which are terminated at the BS on the network side. Although not shown, the UE may have several upper layers above the L2 layer 908 including a network layer (e.g., IP layer) that is terminated at the PDN gateway 118 on the network side, and an application layer that is terminated at the other end of the connection (e.g., far end UE, server, etc.).

The PDCP sublayer 914 provides multiplexing between different radio bearers and logical channels. The PDCP sublayer 914 also provides header compression for upper layer data packets to reduce radio transmission overhead, security by ciphering the data packets, and handover support for UEs between BSs. The RLC sublayer 912 provides segmentation and reassembly of upper layer data packets, retransmission of lost data packets, and reordering of data packets to compensate for out-of-order reception due to hybrid automatic repeat request (HARQ). The MAC sublayer 910 provides multiplexing between logical and transport channels. The MAC sublayer 910 is also responsible for allocating the various radio resources (e.g., resource blocks) in one cell among the UEs. The MAC sublayer 910 is also responsible for HARQ operations.

In the control plane, the radio protocol architecture for the UE and BS is substantially the same for the physical layer 906 and the L2 layer 908 with the exception that there is no header compression function for the control plane. The control plane also includes a radio resource control (RRC) sublayer 916 in Layer 3 (L3 layer). The RRC sublayer 916 is responsible for obtaining radio resources (i.e., radio bearers) and for configuring the lower layers using RRC signaling between the BS and the UE.

A UE may be in one of a plurality of operating states. One operating states may be an active state. In the active state, there is a UE context in the BS and an active connection between the UE and the BS. In the active state, the UE may have dedicated resources for transmissions to or from the BS and other devices. The active state may be referred to as "RRC_CONNECTED mode," "RRC_CONNECTED active state," "RRC_DEDICATED," "RRC_ACTIVE," or "active state in RRC_CONNECTED mode" and such terms are used interchangeably herein. When the BS obtains information that the BS should set up an RRC connection with dedicated resources for the UE (e.g., the BS receives an RRC connection resume request message from the UE, the BS obtains data to be transmitted to the UE), then the BS may send a transmission (e.g., a page) to the UE to cause the UE to transition to the active state. When the BS acknowledges the RRC connection resume request message, then the UE may enter the active state.

Another of the states may be referred to as an RRC_IDLE state. In the RRC_IDLE state, the UE may not have an active connection to a BS, and the BS does not have a context for the UE.

This inactive state may be referred to as "RRC_COMMON," "RRC_INACTIVE," "RRC_DORMANT," or as an "inactive state in RRC_CONNECTED mode" and such terms are used interchangeably herein. In the inactive state, the UE does not have any dedicated resources (e.g., time and frequency resources for the UE to transmit on that other UEs are not also transmitting on, time and frequency resources for signals that only the UE is intended to receive). The UE may monitor a paging channel with a CDRX cycle.

Figure 10:
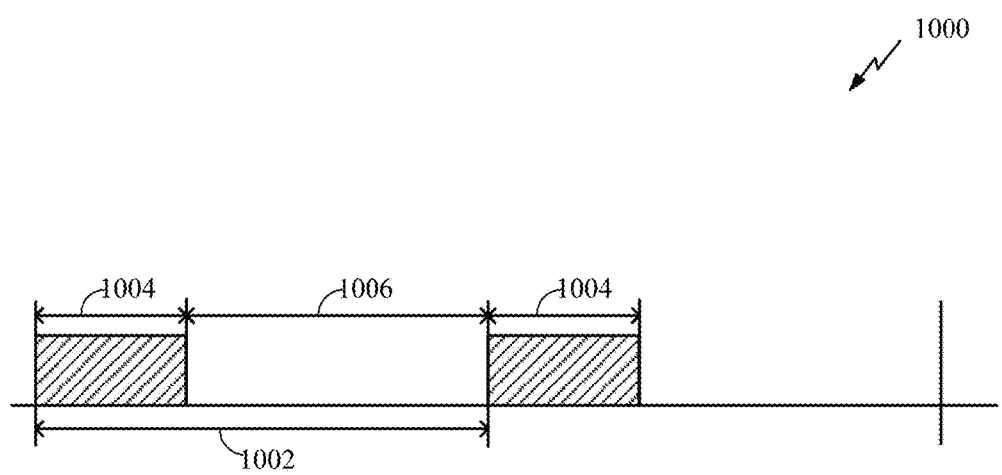
FIG. 10 illustrates an example CDRX period, in accordance with aspects of the present disclosure.

FIG. 10 illustrates an example CDRX period, in accordance with aspects of the present disclosure. In certain cases, rather than constantly monitoring a network for activity, a UE may be configured to monitor for traffic at certain times as a part of a CDRX cycle 1002. During a CRDX on duration 1004, the UE may monitor for traffic, for example on a paging channel such as PDCCH. If the UE obtains data to transmit (e.g., a user activates the UE to start a voice call) to the network (e.g., to a BS or via a BS to another entity), then the UE can perform either a state transition procedure into RRC_CONNECTED mode (e.g., by sending an RRC connection resume message to a BS) or a data transmission procedure that may include contention based access (e.g., performing a contention procedure to access a BS).

During a CDRX off duration 1006, the UE does not expect to receive any transmissions from the network and may enter a low power state by turning off radios, processors, or other components in order to save power. The timing of the CDRX cycle, including on and off periods may be configured by the network may not be known by other wireless devices.

D2D operations, such as LTE-D discovery, may be considered lower priority than activity of WANs, such as LTE.

As a result, LTE-D operations may be performed when the WAN is not actively using utilizing the associated channels. LTE-D operations may be performed during these periods, which may correspond to idle periods or CDRX off periods of some UEs.

In order to communicate with other devices, UEs include one or more wireless chains. Generally, wireless chains refer to a set of components used to detect/transmit and process a RF signal via one or more antennas. For example, a particular UE may include a set of two wireless chains, one receive chain for receiving a RF signal and a transmit chain for transmitting another RF signal. In another example, a UE may be configured for carrier aggregation. Carrier aggregation allows multiple wireless carriers to be combined in order to transmit or receive data, allowing for increased data rates and capacity. UEs supporting carrier aggregation may include two or more sets of wireless chains, each set including a transmit chain and a receive chain.

As discussed above, currently D2D activity, such as LTE-D transmission and reception, may be scheduled when there is no LTE activity scheduled, such as during an idle period or CRDX off period as D2D activity is of a lower priority. Further, some UEs may support carrier aggregation with a capability for performing uplink (UL) on more than a single carrier at a time via multiple transmit chains. However, not all transmit chains may be in use at a given time. For example, when a UE is in a CDRX on state with multiple downlink and only a single uplink carrier is assigned to the UE, one or more transmit chains may be unused.

Example Opportunistic Wan and D2D Coexistence

Figure 11:
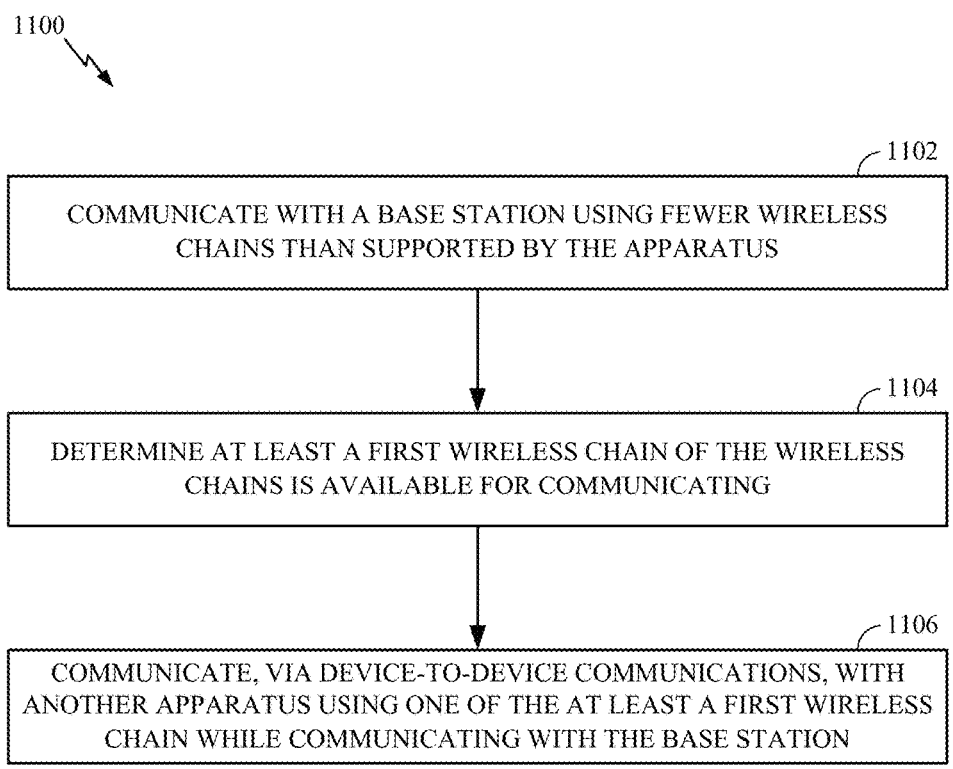
FIG. 11 illustrates example operations for wireless communications by a UE, in accordance with aspects of the present disclosure.

FIG. 11 illustrates example operations 1100 for wireless communications by a UE, in accordance with aspects of the present disclosure. Operations 1100 may begin at 1102, by communicating with a base station using fewer wireless chains than supported by the apparatus. At 1104, determining at least a first wireless chain of the wireless chains is available for communicating. At 1106, communicating, via device-to-device communications, with another apparatus using one of the at least a first wireless chain while communicating with the base station.

Generally, transmit only mode is associated with network side, e.g., by base stations, for cell broadcasts and other broadcast type transmissions. According to aspects of the present disclosure, a UE may also use a transmission only mode for certain D2D activities, such as LTE-D discovery mode, in order to broadcast D2D content, such as discovery information, to other devices. As an example of times associated with transmission only mode, LTE-D transmit only activity may vary from one subframe to several subframes, so long as the duration is less than an LTE-D discovery period, which may vary from between 320 ms to 10.24 seconds. Generally, transmit only average activity time may be around 30-40 ms with a worst case of 320 ms. By overlapping at least some of this time with existing CDRX off periods helps reduce the overall amount of time a UE may need to stay awake.

According to aspects of the present disclosure, as the D2D activity is performed in conjunction with regularly scheduled WAN activity, the D2D activity may, at least partially, avoid CDRX off periods. By overlapping at least some D2D activities with existing CDRX periods, the overall amount of time a UE may need stay in a wake state may be reduced, as compared to where the UE is active for both the CDRX on period and a period for D2D activities scheduled during a CDRX off period. Generally this assumes that the UE has a match for all codes subscribed to during a discovery period such that the UE will not try to perform a LTE-D receive during the same discovery period.

FIG. 12 illustrates example TDD uplink and downlink configurations 1200, according to aspects of the present disclosure. A UE configured for uplink carrier aggregation in TDD may utilize UL/DL configuration scheduling with a network to selectively enable LTE-D transmissions. A UE operating in a certain UL/DL configuration knows the upcoming UL/DL schedule and may be able to schedule D2D transmit specific activity when multiple slots of a complementary activity are scheduled with the network. For example, in configuration 4, a UE may know in advance that three or more consecutive upcoming downlink slots are available and may be able to schedule D2D transmit activity in those slots. During these downlink slots, the UE may receive downlink data from the network using the receive chains, while using an available transmit chain to perform D2D transmit activity. This transmit activity may be performed on predetermined bands not used by the network in the area or may use bands configured by the network. Similarly, when multiple consecutive upcoming uplink slots are available, D2D receive activity may be performed during those slots.

According to aspects of the present disclosure, UEs in a CDRX on period having two or more allocated DL carriers may perform D2D transmit activities using transmit chain(s) while performing WAN activities. In some cases for DL carrier aggregation, multiple receive chains are utilized for DL activity along with less than all transmit chains. For example, a network may be configured to use carrier aggregation across two DL carriers and one uplink carrier. In such cases, no activity is may be scheduled for other transmit chains. As there is no scheduled WAN activity these other transmit chains may be available for D2D transmit activities. The transmit chain used to perform, for example, LTE-D activities in transmission only mode as the receive chains are being used for WAN activity. This transmit activity may also be performed on predetermined bands not used by the network in the area or may use bands configured by the network.

Certain WANs include bands which are configured as downlink only bands. As an incomplete example, bands 29 and 32, along with specific frequencies ranges in band 66 and unlicensed bands 252 (unlicensed NII-1) and 253 (unlicensed NII-3) may be downlink only bands for LTE. These downlink only bands may be aggregated along with other bands for uplink activity. For example, band 2 may be aggregated with band 29 such that band 2 provides uplink and downlink bandwidth and band 29 may be used for additional downlink only bandwidth. According to aspects of the present disclosure, where carrier aggregation is performed over downlink only bands, the transmit chain corresponding to the receive chain being used for the downlink only band will be available for D2D transmit activities. As downlink only bands, by definition, do not support uplink, when CA is performed over a downlink only band, it may be assumed that the transmit chain is available.

According to aspects of the present disclosure, a UE capable of supporting carrier aggregation but assigned less than the full number of carriers supported are used may perform D2D activities on unused wireless chains. For example, a UE supporting carrier aggregation using two sets of wireless chains may be configured by the network to use only one primary carrier using a first set of wireless chains to communicate to communicate with the network while in the UE's CDRX on state. A second of otherwise unused wireless chains may be used to perform LTE-D activity during the CDRX on state. This transmit activity may also be performed on predetermined bands not used by the network in the area or may use bands configured by the network.

According to aspects of the present disclosure, a UE capable of performing D2D activities when less than the full number of carriers supported are used, and also capable of utilizing a transmit chain for D2D activities while the receive chains and some transmit chains are used for WAN activity, may require a preconfigured EFS value to have transmit and receive pools overlapping with the CDRX on period where the UE is capable of two or more DL and 2 or more UL carrier aggregation.

Figure 13:
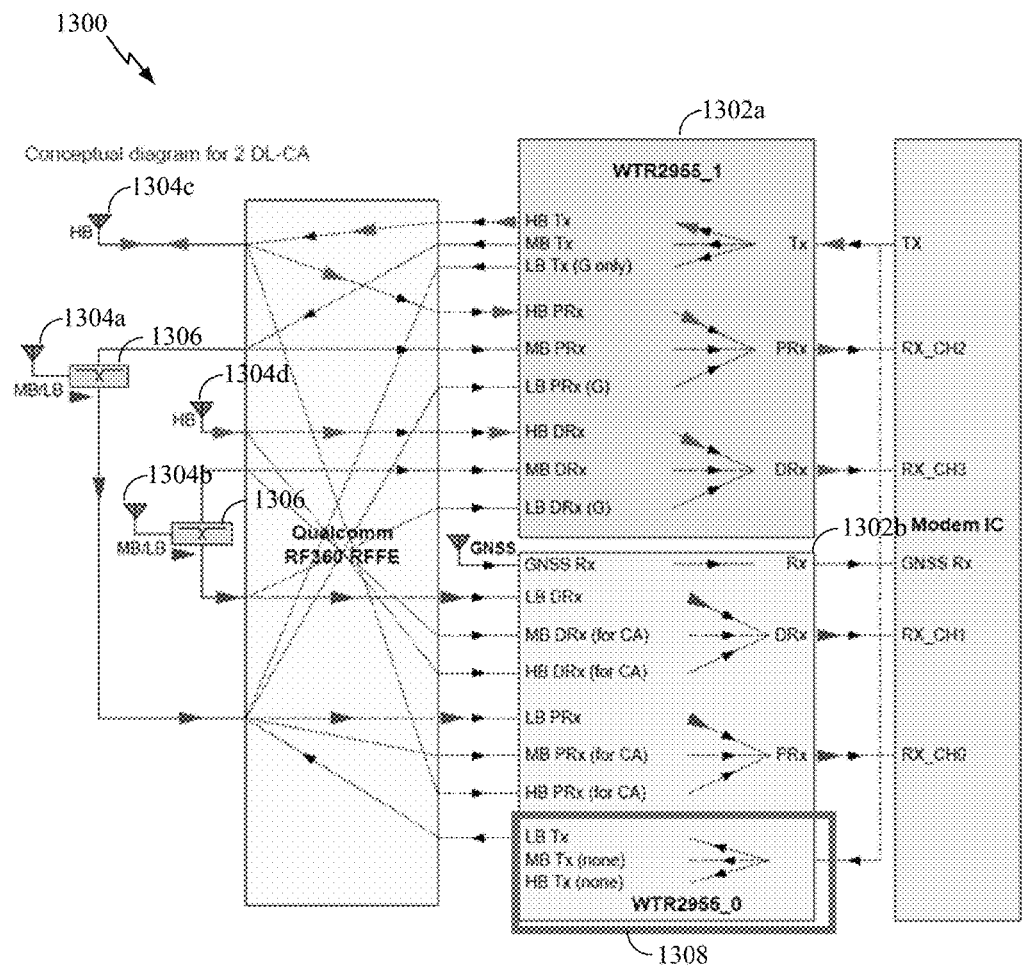
FIG. 13 is a schematic of an example transceiver design capable of performing opportunistic WAN and D2D coexistence, according to aspects of the present disclosure.

FIG. 13 is a schematic 1300 of an example transceiver design capable of performing opportunistic WAN and D2D coexistence, according to aspects of the present disclosure. As shown, two transceivers 1302a and 1302b may be coupled to antennas 1304a-1304d. Antennas, 1304a may include a switch 1306 coupled between the antenna 1304a and transceivers 1302a and 1302b allowing the antenna to be used by transmit chain 1308 of transceiver 1302b to used for D2D transmit activity when the transmit chain 1308 would be otherwise unused for WAN activity.

Figure 14:
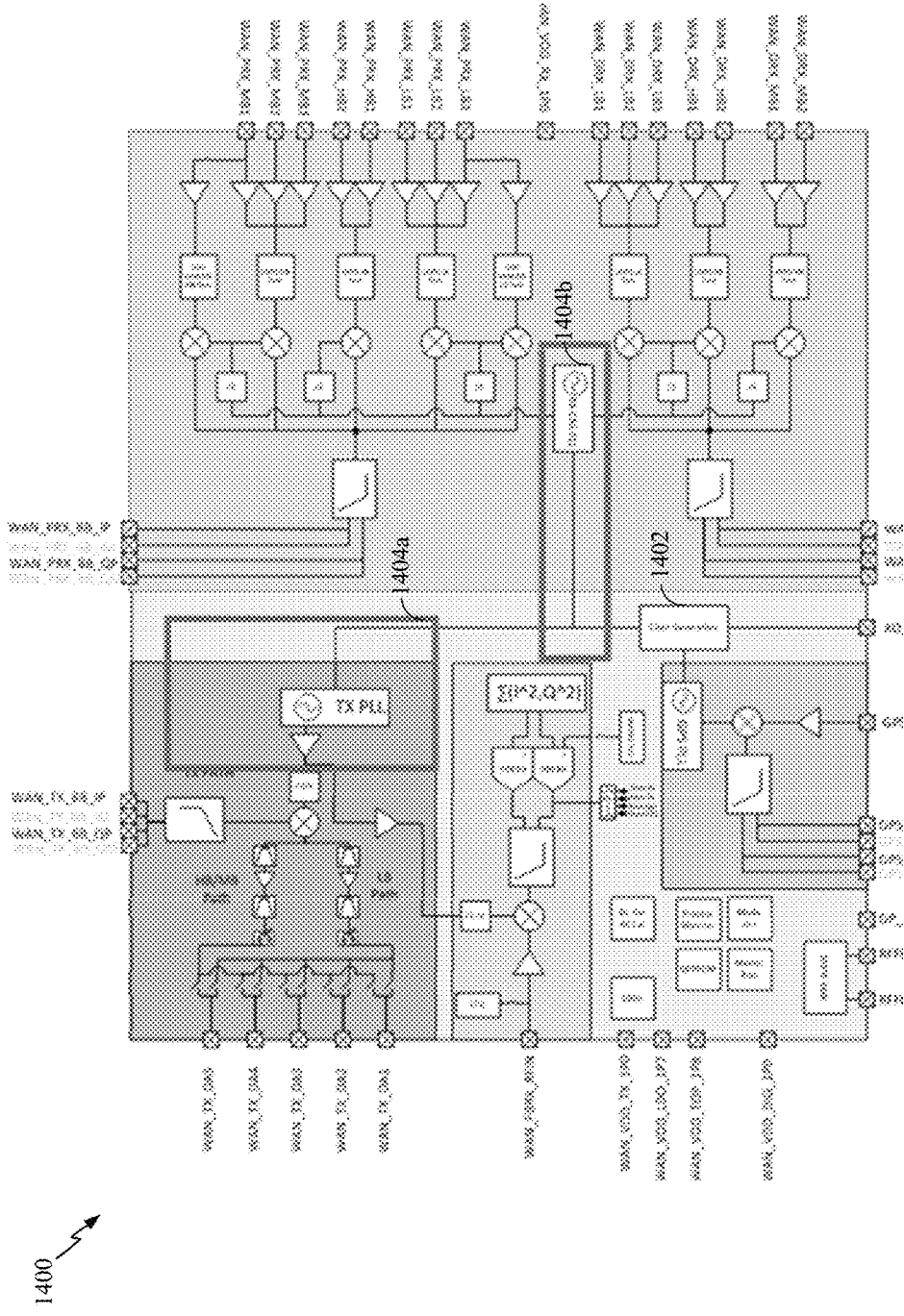
FIG. 14 is a circuit diagram 1400 of a transceiver capable of performing opportunistic WAN and D2D coexistence, according to aspects of the present disclosure.

FIG. 14 is a circuit diagram 1400 of a transceiver capable of performing opportunistic WAN and D2D coexistence, according to aspects of the present disclosure. Generally, a transceiver clock 1402 plan remains the same despite whether the transmit, receive, or both chains are active. The transmit and receive paths may include distinct voltage convertor oscillators (VCO) 1404a and 1404b associated with the transmit and receive paths to allow the path to be used independently.

Figure 15:
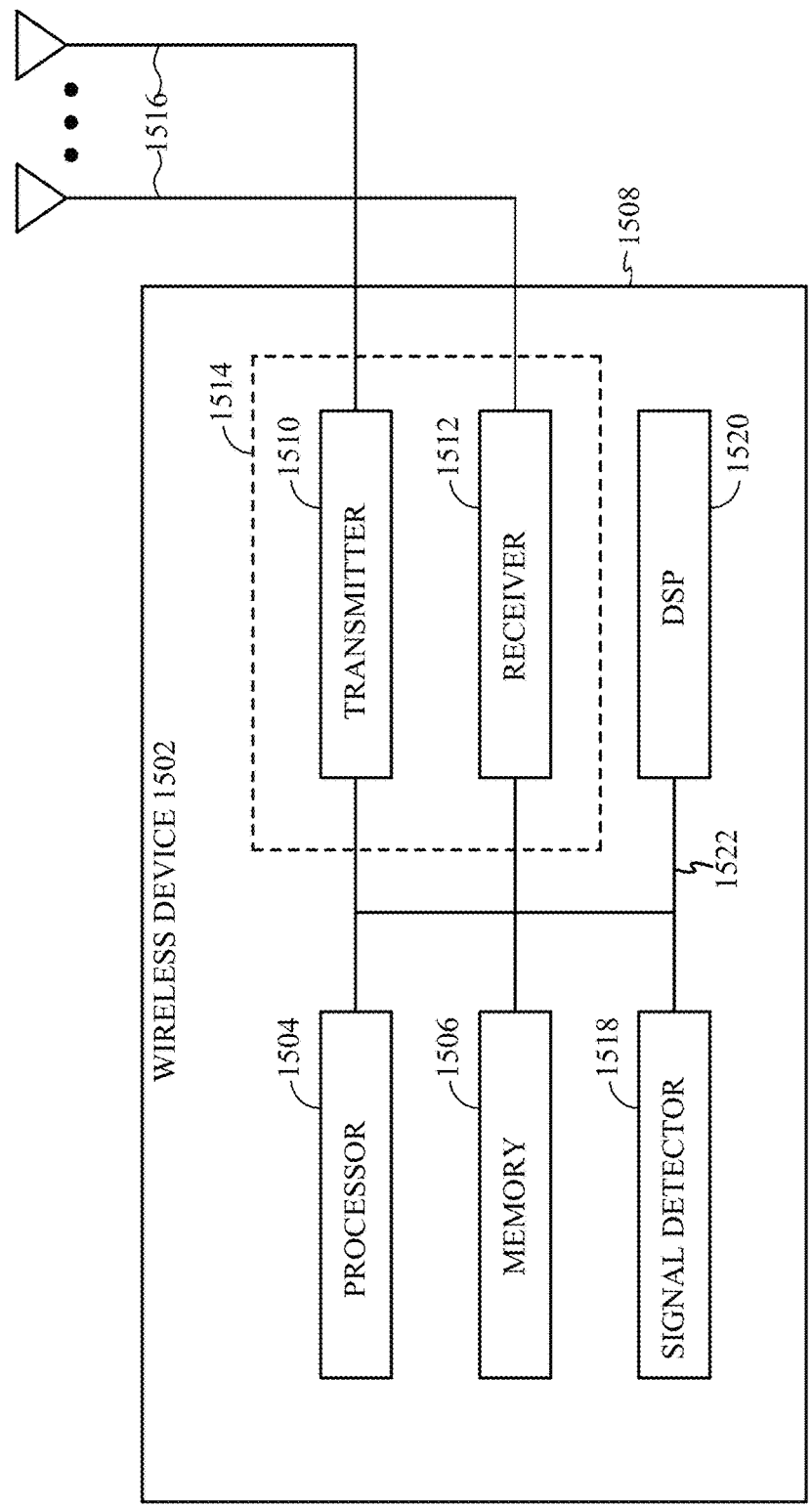
FIG. 15 illustrates various components that may be utilized in a wireless device, according to aspects of the present disclosure.

FIG. 15 illustrates various components that may be utilized in a wireless device 1502, for example, that may be employed as a UE capable of performing opportunistic WAN and D2D coexistence. Thus, the wireless device 1502 is an example of a device that may be configured to implement the various methods described herein.

The wireless device 1502 may include a processor 1504 which controls operation of the wireless device 1502. The processor 1504 may also be referred to as a central processing unit (CPU). Memory 1506, which may include both read-only memory (ROM) and random access memory (RAM), provides instructions and data to the processor 1504. A portion of the memory 1506 may also include non-volatile random access memory (NVRAM). The processor 1504 typically performs logical and arithmetic operations based on program instructions stored within the memory 1506. The instructions in the memory 1506 may be executable to implement the methods described herein.

The wireless device 1502 may also include a housing 1508 that may include a transmitter 1510 and a receiver 1512 to allow transmission and reception of data between the wireless device 1502 and a remote location. The transmitter 1510 and receiver 1512 may be combined into a transceiver 1514. A single or a plurality of transmit antennas 1516 may be attached to the housing 1508 and electrically coupled to the transceiver 1514. The wireless device 1502 may also include (not shown) multiple transmitters, multiple receivers, and multiple transceivers.

The wireless device 1502 may also include a signal detector 1518 that may be used in an effort to detect and quantify the level of signals received by the transceiver 1514. The signal detector 1518 may detect such signals as total energy, energy per subcarrier per symbol, power spectral density and other signals. The wireless device 1502 may also include a digital signal processor (DSP) 1520 for use in processing signals.

It is understood that the specific order or hierarchy of steps in the processes disclosed above is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

For example, means for transmitting may comprise a transmitter, such as the transmitter unit illustrated in FIG. 2, the transmitter unit 1510 of the wireless device depicted in FIG. 15, or a transmitter/receiver depicted in FIGS. 13-14. Means for receiving may comprise a receiver, such as the receiver unit 1512 of the wireless device depicted in FIG. 15 or a transmitter/receiver unit depicted in FIGS. 13-14. Means for processing, means for determining, means for altering, means for generating, means for correcting, and/or means for checking may comprise a processing system, which may include one or more processors depicted in FIG. 15.

Further, in some cases, rather than actually transmit a frame (or other structure), an entity (e.g., a processor) may output such a structure via a transmit interface to another entity (e.g., an RF front end or modem) for transmission. Similarly, rather than actually receive a subframe (or other structure), an entity (e.g., a processor) may receive such a structure from another entity (e.g., from an RF front end or modem) via a receive interface. For example, the receive interface may include a bus interface or other type interface.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Moreover, the term "or" is intended to mean an inclusive "or" rather than an exclusive "or." That is, unless specified otherwise or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c, as well as any combinations with multiples of the same element.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication by an apparatus, comprising:
   communicating with a base station using fewer wireless chains than supported by the apparatus;
   determining at least a first wireless chain of the wireless chains is available for communicating with another apparatus while the apparatus is in a connected mode discontinuous reception (CDRX) on period associated with the base station; and
   communicating, via device-to-device communications, with the other apparatus using one of the at least a first wireless chain while communicating with the base station during the CDRX on period.

2. The method of claim 1, wherein the at least a first wireless chain is not used to communicate with the base station while transmitting to the other apparatus.

3. The method of claim 1, wherein the determining is based on a TDD UL/DL subframe configuration associated with the at least a first wireless chain.

4. The method of claim 3, wherein the determining is based on the TDD UL/DL subframe configuration having a plurality of consecutive downlink subframes.

5. The method of claim 4, wherein:
   the determining comprises determining the at least a first wireless chain is available for transmitting based on the TDD UL/DL subframe configuration; and
   the communicating, via device-to-device communications, with the other apparatus comprises transmitting, via device-to-device communications, to the other apparatus using one of the at least a first wireless chain of the wireless chains.

6. The method of claim 3, wherein the determining is based on the scheduled TDD UL/DL subframe configuration having at a plurality of consecutive uplink subframes.

7. The method of claim 6, wherein:
   the determining comprises determining the at least first wireless chain is available for receiving based on the TDD UL/DL subframe configuration; and
   the communicating, via device-to-device communications, with the other apparatus comprises receiving, via device-to-device communications, from the other apparatus using one of the at least a first wireless chain of the wireless chains.

8. The method of claim 1, wherein the communicating with the other apparatus includes at least one of transmitting to the other apparatus or receiving from the other apparatus.

9. The method of claim 1, wherein the apparatus is configured to use two or more downlink carriers, and the determining at least a first wireless chain of the wireless chains is available for communicating comprises determining a wireless chain of the wireless chains is scheduled for each downlink carrier of the two or more downlink carriers.

10. The method of claim 9, wherein communicating, via device-to-device communications, with the other apparatus using one of the at least a first wireless chain while communicating with the base station includes transmitting, via device-to-device communications, to the other apparatus using one of the at least a first wireless chain of the wireless chains.

11. The method of claim 9, wherein the apparatus is configured to use two or more downlink carriers, and the determining at least a first wireless chain of the wireless chains is available for communicating comprises determining that a downlink carrier of the two or more downlink carriers uses a downlink only frequency band.

12. The method of claim 11, wherein the downlink only frequency band comprises at least one of bands 29, 32, 252, 253, unlicensed bands NII-1 and NII-3, or portions of band 66.

13. The method of claim 1, wherein the apparatus supports using two or more carriers, and the determining at least a first wireless chain of the wireless chains is available for communicating comprises determining the apparatus is configured to use fewer carriers than supported by the apparatus.

14. The method of claim 13, wherein communicating, via device-to-device communications, with the other apparatus using one of the at least a first wireless chain while communicating with the base station includes transmitting, via device-to-device communications, to the other apparatus using one of the at least a first wireless chain of the wireless chains.

15. An apparatus for wireless communication, comprising:
   means for communicating with a base station using fewer wireless chains than supported by the apparatus;
   means for determining at least a first wireless chain of the wireless chains is available for communicating with another apparatus while the apparatus is in a connected mode discontinuous reception (CDRX) on period associated with the base station; and
   means for communicating, via device-to-device communications, with the other apparatus using one of the at least a first wireless chain while communicating with the base station during the CDRX on period.

16. The apparatus of claim 15, wherein the determination is based on a TDD UL/DL subframe configuration associated with the at least a first wireless chain.

17. The apparatus of claim 15, wherein the apparatus is configured to use two or more downlink carriers, and the determining at least a first wireless chain of the wireless chains is available for communicating comprises determining a wireless chain of the wireless chains is scheduled for each downlink carrier of the two or more downlink carriers.

18. The apparatus of claim 15, wherein the apparatus supports using two or more carriers, and the determining at least a first wireless chain of the wireless chains is available for communicating comprises determining the apparatus is configured to use fewer carriers than supported by the apparatus.

19. An apparatus for wireless communication, comprising:
   an interface for communicating with a base station using fewer wireless chains than supported by the apparatus;
   a processor configured to determine at least a first wireless chain of the wireless chains is available for communicating with another apparatus while the apparatus is in a connected mode discontinuous reception (CDRX) on period associated with the base station and to communicate, via device-to-device communications, with the other apparatus using one of the at least a first wireless chain while communicating with the base station during the CDRX on period.

20. The apparatus of claim 19, wherein the determination is based on a TDD UL/DL subframe configuration associated with the at least a first wireless chain.

21. The apparatus of claim 19, wherein the apparatus is configured to use two or more downlink carriers, and the determining at least a first wireless chain of the wireless chains is available for communicating comprises determining a wireless chain of the wireless chains is scheduled for each downlink carrier of the two or more downlink carriers.

22. The apparatus of claim 19, wherein the apparatus supports using two or more carriers, and the determining at least a first wireless chain of the wireless chains is available for communicating comprises determining the apparatus is configured to use fewer carriers than supported by the apparatus.

23. A non-transitory computer readable medium having instructions stored thereon for:
communicating with a base station using fewer wireless chains than supported by an apparatus;
determining at least a first wireless chain of the wireless chains is available for communicating with another apparatus while the apparatus is in a connected mode discontinuous reception (CDRX) on period associated with the base station; and
communicating, via device-to-device communications, with the other apparatus using one of the at least a first wireless chain while communicating with the base station during the CDRX on period.

24. The computer readable medium of claim 23, wherein the determining is based on a TDD UL/DL subframe configuration associated with the at least a first wireless chain.

25. The computer readable medium of claim 23, wherein the apparatus is configured to use two or more downlink carriers, and the determining at least a first wireless chain of the wireless chains is available for communicating comprises determining a wireless chain of the wireless chains is scheduled for each downlink carrier of the two or more downlink carriers.

26. The computer readable medium of claim 23, wherein the apparatus supports using two or more carriers, and the determining at least a first wireless chain of the wireless chains is available for communicating comprises determining the apparatus is configured to use fewer carriers than supported by the apparatus.

* * * * *